US010077884B2

(12) United States Patent
Di Trapani et al.

(10) Patent No.: US 10,077,884 B2
(45) Date of Patent: Sep. 18, 2018

(54) ARTIFICIAL LIGHTING SYSTEM FOR SIMULATING NATURAL LIGHTING

(71) Applicant: COELUX S.r.l., Como (IT)

(72) Inventors: Paolo Di Trapani, Como (IT); Davide Magatti, Como (IT)

(73) Assignee: COELUX S.R.L., Como (IT)

( * ) Notice: Subject to any disclaimer, the term of this patent is extended or adjusted under 35 U.S.C. 154(b) by 253 days.

(21) Appl. No.: 13/838,998

(22) Filed: Mar. 15, 2013

(65) Prior Publication Data

US 2014/0133125 A1    May 15, 2014

(30) Foreign Application Priority Data

Nov. 14, 2012   (IT) .............................. TO2012A0988

(51) Int. Cl.
*F21V 9/02*     (2018.01)
*E04B 9/32*     (2006.01)
(Continued)

(52) U.S. Cl.
CPC .................. *F21V 9/02* (2013.01); *E04B 9/32* (2013.01); *E06B 7/28* (2013.01); *F21S 8/02* (2013.01);
(Continued)

(58) Field of Classification Search
CPC ... G02B 5/0242; F21V 9/02; F21Y 2105/001; F21S 8/006; F21W 2121/008
(Continued)

(56) References Cited

U.S. PATENT DOCUMENTS 1,406,115 A * 2/1922 Verch .................. F21S 48/1388
                                                    362/232
1,476,149 A * 12/1923 Cohen ........................... 362/282
(Continued)

FOREIGN PATENT DOCUMENTS

DE           3437271 A1 *  4/1986  .............. F21S 8/006
DE     102005010702 A1 *  9/2006  ............... E06B 9/30
(Continued)

OTHER PUBLICATIONS

Office Action issued in Japanese Application No. 2015/542399 dated Oct. 3, 2017.
(Continued)

*Primary Examiner* — Alexander Garlen
*Assistant Examiner* — Colin Cattanach
(74) *Attorney, Agent, or Firm* — Workman Nydegger

(57) ABSTRACT

A system for illuminating an environment with light that simulates natural light includes: a first light source which emits a beam of visible light; a diffused-light generator delimited by an inner surface, which receives the light beam, and an outer surface, the diffused-light generator being at least partially transparent to a long wavelength component of the beam of visible light. The diffused-light generator transmits diffused light from a short wavelength component of the beam of visible light, through the outer surface, the correlated color temperature of the transmitted light being lower than the CCT of the visible diffused light. The lighting system includes a dark box which hosts the first light source and is optically coupled to the environment via the diffused-light generator.

32 Claims, 7 Drawing Sheets

(51) Int. Cl.

| | | |
|---|---|---|
| *F21S 8/02* | (2006.01) | |
| *F21V 7/00* | (2006.01) | |
| *E06B 7/28* | (2006.01) | |
| *F21V 7/06* | (2006.01) | |
| *F21V 11/08* | (2006.01) | |
| *F21V 8/00* | (2006.01) | |
| *F21V 3/08* | (2018.01) | |
| *F21V 3/06* | (2018.01) | |
| *F21S 8/00* | (2006.01) | |
| *F21W 121/00* | (2006.01) | |
| *E04D 13/03* | (2006.01) | |
| *F21Y 101/00* | (2016.01) | |
| *F21V 3/10* | (2018.01) | |

(52) U.S. Cl.
CPC ........ *F21V 3/0615* (2018.02); *F21V 3/0625* (2018.02); *F21V 3/08* (2018.02); *F21V 7/0008* (2013.01); *F21V 7/0041* (2013.01); *F21V 7/06* (2013.01); *F21V 11/08* (2013.01); *G02B 6/0011* (2013.01); *E04D 2013/0345* (2013.01); *F21S 8/006* (2013.01); *F21V 3/10* (2018.02); *F21W 2121/008* (2013.01); *F21Y 2101/00* (2013.01)

(58) Field of Classification Search
USPC ..... 362/296.05–296.09, 297, 311.01–311.03, 362/311.12, 310, 311.06–311.11, 311.13, 362/311.14
See application file for complete search history.

(56) References Cited

U.S. PATENT DOCUMENTS

| | | | | |
|---|---|---|---|---|
| 3,225,188 | A * | 12/1965 | Le Vantine | F21S 8/006 359/727 |
| 3,732,004 | A * | 5/1973 | Yamanoi et al. | 399/221 |
| 4,267,489 | A | 5/1981 | Morohashi | |
| 4,456,948 | A * | 6/1984 | Brun | 362/268 |
| 4,747,028 | A | 5/1988 | Piotrovsky | |
| 4,747,033 | A * | 5/1988 | Yasuda | F21S 8/00 355/67 |
| 5,142,459 | A * | 8/1992 | Swarens et al. | 362/147 |
| 5,709,460 | A * | 1/1998 | Lester | 362/147 |
| 6,206,544 | B1 * | 3/2001 | Costa | 362/242 |
| 6,508,579 | B1 * | 1/2003 | Ruud et al. | 362/551 |
| 6,789,914 | B1 * | 9/2004 | Brown et al. | 362/147 |
| 6,819,493 | B2 * | 11/2004 | Mizouchi | 359/619 |
| 7,237,929 | B2 * | 7/2007 | Stahl | 362/297 |
| 7,403,680 | B2 * | 7/2008 | Simbal | G02B 6/4204 257/98 |
| 7,566,155 | B2 * | 7/2009 | Schug | F21S 48/1154 362/231 |
| 7,573,073 | B2 * | 8/2009 | Leatherdale et al. | 257/98 |
| 7,722,220 | B2 | 5/2010 | Van De Ven | |
| 8,096,668 | B2 * | 1/2012 | Abu-Ageel | 362/84 |
| 8,303,134 | B2 * | 11/2012 | Byrne | F21S 8/02 362/125 |
| 8,371,725 | B2 * | 2/2013 | Chuang | 362/327 |
| 8,425,101 | B2 * | 4/2013 | Boonekamp | 362/609 |
| 8,449,138 | B2 * | 5/2013 | Kim et al. | 362/217.13 |
| 8,496,354 | B2 * | 7/2013 | Jurik et al. | 362/279 |
| 8,604,678 | B2 * | 12/2013 | Dai et al. | 313/112 |
| 8,848,267 | B2 * | 9/2014 | Kurashige | 359/15 |
| 2004/0012957 | A1 * | 1/2004 | Bachl | F21V 5/007 362/241 |
| 2005/0219849 | A1 | 10/2005 | Kotovsky | |
| 2005/0231976 | A1 * | 10/2005 | Keuper | G02B 6/0046 362/600 |
| 2006/0114430 | A1 * | 6/2006 | Masubuchi et al. | 353/99 |
| 2007/0211487 | A1 * | 9/2007 | Sormani | 362/545 |
| 2008/0298059 | A1 * | 12/2008 | Schug | H01L 33/58 362/240 |
| 2009/0147524 | A1 * | 6/2009 | Williams | H01J 61/025 362/296.06 |
| 2009/0200939 | A1 | 8/2009 | Lenk | |
| 2009/0273302 | A1 | 11/2009 | Staats | |
| 2009/0284685 | A1 * | 11/2009 | Yamaguchi | 349/64 |
| 2010/0157607 | A1 * | 6/2010 | Venhaus | 362/294 |
| 2011/0090713 | A1 * | 4/2011 | Chen | G02B 6/0036 362/612 |
| 2011/0194270 | A1 * | 8/2011 | Di Trapani | G02B 6/001 362/2 |
| 2012/0008338 | A1 * | 1/2012 | Ono et al. | 362/606 |
| 2012/0025838 | A1 * | 2/2012 | Lee | F21S 8/006 324/501 |
| 2012/0026746 | A1 * | 2/2012 | Schug | F21S 48/1145 362/487 |
| 2012/0086034 | A1 * | 4/2012 | Yuan et al. | 257/98 |
| 2013/0114264 | A1 * | 5/2013 | Ogawa | F21S 8/006 362/293 |

FOREIGN PATENT DOCUMENTS

| | | | | |
|---|---|---|---|---|
| EP | 2304478 | | 4/2011 | |
| EP | 2304480 | | 4/2011 | |
| EP | 2532947 | A1 | 12/2012 | |
| JP | 4292801 | A | 10/1992 | |
| JP | 2001167607 | A | 6/2001 | |
| JP | WO 2010093048 | A1 * | 8/2010 | ............ F21S 8/006 |
| JP | WO 2012002219 | A1 * | 1/2012 | ............ F21S 8/006 |
| WO | 2009/156347 | | 12/2009 | |
| WO | 2009/156348 | | 12/2009 | |
| WO | 2012140579 | A2 | 10/2012 | |
| WO | 2011152082 | A | 7/2013 | |

OTHER PUBLICATIONS

Office Action issued in U.S. Appl. No. 14/442,583 dated Oct. 5, 2017.

International Search Report and Written Opinion issued in PCT/IB2013/060141 dated Apr. 2, 2014.

* cited by examiner

ARTIFICIAL LIGHTING SYSTEM FOR SIMULATING NATURAL LIGHTING

PRIORITY CLAIM

The instant application claims priority to Italian Patent Application No. TO2012A000988, filed Nov. 14, 2012, which application is incorporated herein by reference in its entirety.

TECHNICAL FIELD

An embodiment relates to a system of artificial lighting. In particular, an embodiment relates to a system of artificial lighting that simulates natural lighting. Such lighting system may illuminate a room wherein it is inserted, with effects very similar to the effects that would occur in the same room if an aperture with the sky and sun beyond it were opened.

BACKGROUND

It is known that, as of today, artificial lighting systems for closed environments ("indoors") are available which aim at improving the visual comfort experienced by users. In particular, lighting systems are known which simulate natural lighting, namely the type of lighting available in open-air environments ("outdoors"). The well-known characteristics of outdoor lighting depend on the interaction between light rays produced by the sun and the earth's atmosphere.

In pending European patent application EP2304480, which is incorporated by reference, a lighting system is described which includes a luminous source, aimed at producing visible light, and a panel containing nanoparticles. When in use, the panel receives light rays coming from the source and acts as a so-called Rayleigh diffuser, namely it diffuses light rays similarly to the earth's atmosphere in clear-sky conditions.

Additional details relative to the panel as in pending patent EP2304480 are described in pending European patent application EP2304478, which is incorporated by reference. Moreover, pending patent application EP2304480 describes various embodiments of the panel as well as various arrangements of the panel and the light source in respect to one another, aimed at simulating various conditions of natural lighting, such as for example lighting conditions that occur in nature in case of clear sky and i) sun at zenith or ii) sun close to the horizon.

The lighting system described in patent application EP2304480 simulates natural lighting in that it generates, inside the surrounding environment, direct light with low Correlated Color Temperature ("CCT"), which mimics sunlight and generates shadows in presence of lit objects; also, the lighting system described in patent application EP2304480 simulates natural lighting in that it casts diffused light with high CCT, which mimics skylight and generates shadows with a blue tinge. Nonetheless, such lighting system does not flawlessly reproduce the perceptive effects an observer would experience in presence of a sky-facing window. In particular, such lighting system does not lead an observer to experience the visual perception of unlimited depth of field.

SUMMARY

Thus, an embodiment provides a lighting system capable of solving the known state-of-the-art limitations, at least in part.

BRIEF DESCRIPTION OF THE DRAWINGS

For a better understanding of the subject matter disclosed herein, embodiments are hereby described, purely as non-limitative examples and with reference to the enclosed drawings, wherein.

DETAILED DESCRIPTION

Figure 1:
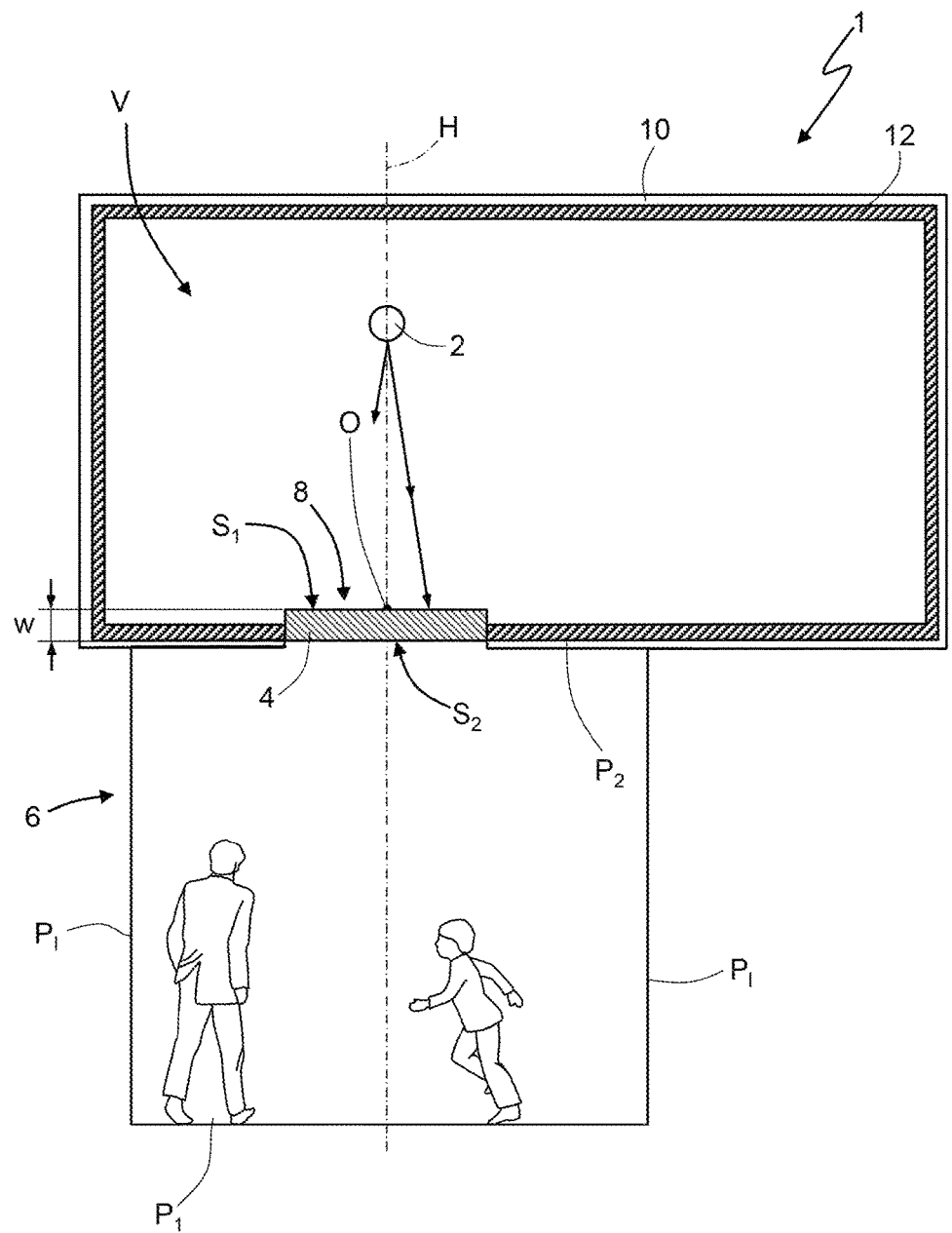
FIGS. 1, 2, and 7 show schematic cross-sections of embodiments of the present lighting system.

In general, it has been noticed that the capability of an observer to evaluate the distances of objects, and, therefore. the depth of field of the views that constitute a three-dimensional scene, is based on multiple physiological and psychological mechanisms connected to focusing, binocular convergence, binocular parallax, movement parallax, luminance, size, contrast, aerial perspective, etc. Some mechanisms may gain significance compared to the others according to both the observing conditions (e.g., whether the observer is moving or still, watching with one or two eyes, etc.) as well as the characteristics of the scenery, these latter depending, for example, on whether objects with known size, distance, or luminance are present, serving as a reference to evaluate how distant the observed element of the scenery is.

In particular, it has been noticed that an observer, who is watching a light projector through a window, loses the capability of estimating how far the projector is when such distance is higher than approximately five meters (for example, approximately seven meters away), provided that the background surrounding the projector is black and uniform. When such circumstances are met, the distance from the projector is undetermined by the observer. The capability of estimating distances is lost because i) precise focusing of a blinding light source is difficult, which prevents the observer from using the focusing mechanism to evaluate the object's distance, and ii) binocular convergence is scarcely efficient as an instrument for distance evaluation when the object is more than approximately five meters away (for example approximately seven meters away); moreover, the capability to estimate is lost because the other psycho-physic mechanisms that are commonly valid and efficient in case of high distances fail, being inhibited by the absence of further points of reference.

It has been further noticed that, when a Rayleigh diffusion panel is interposed between the observer and the light projector, this latter being surrounded by a black, uniform background, the observer is induced to perceive the light projector virtually at an infinite distance from him. More particularly, the effect of perception at infinite distance is obtained whenever the observer looks at the light projector through the Rayleigh diffusion panel, and this latter panel is thoroughly and uniformly lit by the projector, and the real projector-to-observer distance is approximately five meters at least (for example, approximately seven meters). Such effect may be interpreted as a consequence of the so-called "aerial perspective", a perception mechanism induced by the Rayleigh diffusion panel. As a matter of fact, the color and intensity of light scattered by the Rayleigh diffusion panel are virtually identical to the corresponding color and intensity of skylight, where intensity is evaluated as relative to the intensity of transmitted light. In particular, the so-called aerial-perspective mechanism relates to the presence of an air layer interposed between any objects and the observer; the color and luminance of such air layer affect the estimation of the object-to-observer distance, the object being perceived by the observer as lying behind the air layer itself; such mechanism is dominant at high distances or, generally speaking, when the other psycho-physic mechanisms for distance evaluation are suppressed or scarcely efficient.

It has been further noticed that the observer is led to perceive light emitted by the Rayleigh diffusion panel as coming from a virtually infinite distance, provided that the spotlight is inside the observer's visual field. Such effect may be interpreted by considering that the Rayleigh diffusion panel acts as a secondary source of luminous radiation, and that the observer can hardly assess his distance from the emitting plane of such luminous radiation because of the high spatial uniformity of luminous radiation itself, which does not provide any visual point of reference to look upon. Thus, the presence of the light projector in the visual field at a (physical) distance of approximately five meters (for example, approximately seven meters) affects the evaluation of the whole scenery's depth of field by "dragging" the estimated position of the Rayleigh diffusion panel beyond the threshold of distance perception by binocular convergence. Such effect is connected to the luminance of the light projector, and to the fact that, besides the Rayleigh diffusion panel, the light projector itself is the only spatially localized element perceived by the observer. Basically, when looking at the Rayleigh diffusion panel, the eyes of the observer are forced by the light projector to arrange themselves as if they were watching a very distant object. The mind is then pushed by such arrangement of the eyes to infer that the object in the middle of the visual field, that is light emitted by the Rayleigh diffusion panel, is very far compared to the real position of the panel itself. Also, the effect of perceiving a diffused-light source at great distance from the observer is favored by the fact that light scattered by the Rayleigh diffusion panel has the same color and luminance (compared to transmitted light) typical of skylight. Such effect, due to the aforementioned mechanism of aerial perspective, is particularly efficient, thereby causing the light projector to be perceived at virtually infinite distance. It has also been noticed that the described effect, that is the visual perception of an infinite depth of field (from now on called the "breakthrough effect"), takes place irrespective of the direction of observation through the Rayleigh diffusion panel.

In addition, it has been noticed that the aerial perspective alone cannot perfectly assure the breakthrough effect, if the light projector is outside the visual field, because other psycho-physic mechanisms prevail, such as the focusing of scratches or borders of the Rayleigh diffusion panel.

Moreover, it has been noticed that the aforementioned breakthrough effect is reduced whenever the light projector is positioned next to the Rayleigh diffusion panel, e.g., without any mirrors or lenses to move afar its virtual image. In fact, the light projector's distance would be in this case easily estimated by the observer, which would limit the depth of field in the whole scenery despite the contribution of the aerial perspective. Similarly, it has been noticed that the aforementioned breakthrough effect is reduced whenever the light projector is not surrounded by a black, uniform background. In fact, an observer can determine the distance from a background other than a black and uniform background, thereby limiting the depth of field of the whole scenery, in spite of the contribution of the aerial perspective.

That having being stated, FIG. 1 shows an artificial lighting system 1, which will be from now on referred to concisely as lighting system 1, according to an embodiment.

In detail, lighting system 1 includes a first light source 2, for example, directional, i.e., designed to emit light in an emission solid angle smaller than $4\pi$ sr. Moreover, the first light source 2 emits light in the visible region of the spectrum, that is having wavelengths between approximately 400 nm and 700 nm. Moreover, the first light source 2 emits light (visible electromagnetic radiation) with spectral width $\Delta\lambda$, for example, higher than approximately 100 nm, such as higher than approximately 170 nm. Spectral width $\Delta\lambda$ may be defined as the standard deviation of the first light source's wavelength spectrum.

The lighting system 1 also includes a first diffuser panel 4, which is, for example, shaped as a parallelepiped. In particular, the first diffuser panel 4 is delimited by a first surface $S_1$ and by a second surface $S_2$, parallel to each other; for example, the first diffuser panel 4 is thin, i.e., its thickness w, measured along a direction perpendicular to the first and the second surfaces $S_1$, $S_2$, has a square value not higher than approximately 5%, for example, not higher than approximately 1%, of the area of the first and the second surfaces $S_1$, $S_2$.

More particularly, in the embodiment shown in FIG. 1, the first diffuser panel 4 operates as a so-called Rayleigh diffuser, i.e., as a panel which substantially does not absorb light in the visible range and which diffuses more efficiently the short-wavelength in respect to the long-wavelength components of the impinging light, e.g., a panel which substantially does not absorb light in the visible range and which diffuses light rays of wavelength $\lambda$=450 nm (blue) at least approximately 1.2 times, for example, approximately at least 1.4 times, such as at least approximately 1.6 times, more efficiently than light rays of wavelength $\lambda$=650 nm (red), wherein diffusion efficiency is given by the ratio between the diffused light radiant power with respect to the impinging light radiant power. Optical properties and microscopic characteristic of Rayleigh like diffusers are also described in detail in the patent application EP2304478, which is incorporated by reference. A further insight on the microscopic features is also provided in what follows.

In the embodiment shown in FIG. 1, the first light source 2 is vertically aligned to the first diffuser panel 4, i.e., it lies along an axis H, which is perpendicular to the first and second surfaces $S_1$, $S_2$ and passes through the barycenter of these latter surfaces (in FIG. 1, the barycenter of the first surface $S_1$ is designated by O). Moreover, the first light source 2 illuminates entirely the first diffuser panel 4. Embodiments wherein the first light source 2 is arranged off-axis in respect to the barycenter of the first and second surfaces $S_1$, $S_2$ are, however, possible, as described in what follows.

The lighting system 1 is optically coupled to an environment, e.g., a room 6 shaped as a parallelepiped and delimited by a lower wall $P_1$, an upper wall $P_2$ and four lateral walls $P_I$. In particular, without losing generality, it is assumed that the upper wall $P_2$ has a cavity 8, which has, seen from above, the same shape as the first diffuser panel 4, and is filled entirely by the first diffuser panel. In any case, embodiments are not restricted to the shape or arrangement of the cavity 8; as an example, according to further embodiments (not shown), the cavity may be formed within a lateral wall. Furthermore, embodiments are not restricted to be used in indoor spaces; therefore, embodiments are possible in which the lighting device 1 is used as a system for outdoor day-like illumination during night time. Therefore, the lighting system 1 can be coupled to an outdoor environment, i.e., an environment equivalent to a room, the walls of which are either black or arranged at an infinitely large distance.

The lighting system 1 includes a support element 10 that delimits, together with the first surface $S_1$ of the first diffuser panel 4, an external volume V, which is external to the room 6; the first light source 2 is placed inside the external volume V. Although not shown, embodiments are possible in which the support element 10 is mechanically coupled to the room 6 in a manner such that the external volume V is delimited at least in part also by a wall of the room 6, as an example the upper wall $P_2$.

The support element 10 is internally coated by an internal layer 12, made of a material capable of absorbing incident luminous radiation; such material is, for example, a material with black color and coefficient of absorption higher than approximately 70%, for example higher than 90%, such as higher than 95%, and even such as higher than 97% in the visible range. The internal layer 12 is aimed at absorbing incident radiation that comes, for example, directly from the first light source 2, or from reflection or scattering processes by the first diffuser panel 4, or from the room 6 through the first diffuser panel 4. For example, the volume V is internally coated by the internal layer 12 in its entirety, with the exception of the first surface $S_1$ of the first diffuser panel 4. In other words, the support element 10 and the internal layer 12 define a sort of dark box; therefore, in what follows, reference will also be made to a dark box 10. In an embodiment, light can enter/exit the dark box only through the first diffuser panel 4.

Again referring to the first diffuser panel 4, and assuming that a light beam generated by a CIE (International Commission on Illumination) D65 standard illuminant point-like source at large distance from the first diffuser panel 4 (a beam, thus, constituted by light rays parallel to one another) and directed perpendicularly to the first surface $S_1$, the first diffuser panel 4 separates such beam in four components, particularly in:

a transmitted component, formed by light rays that pass through the first diffuser panel 4 and do not experience significant deviations, i.e., by light rays experiencing a deviation smaller than 0.1°, with a luminous flux which is a fraction $\tau_{direct}$ of the overall luminous flux incident on the first diffuser panel 4;

a forward diffuse component, formed by light rays exiting the second surface $S_2$ along directions that are distributed around a direction perpendicular to the second surface $S_2$ (with the exception of such perpendicular direction and of directions differing from such perpendicular direction by an angle smaller than 0.1°), with a luminous flux which is a fraction $\tau_{scattered}$ of the overall luminous flux incident on the first diffuser panel 4;

a backward diffuse component, formed by light rays exiting the first surface $S_1$ along directions that are distributed around a direction perpendicular to the first surface $S_1$ (with the exception of such perpendicular direction and of directions differing from such perpendicular direction by an angle smaller than 0.1°), with a luminous flux which is a fraction $\rho_{scattered}$ of the overall luminous flux incident on the first diffuser panel 4; and a reflected component, formed by light rays exiting, or originating from, the first surface $S_1$ along a direction at a mirror angle (e.g., perpendicular, or differing from the perpendicular by an angle smaller than 0.1°, in the present case) to the first surface $S_1$, with a luminous flux which is a fraction $\rho_{direct}$ of the overall luminous flux incident on the first diffuser panel 4.

That having being stated, the optical properties of the first diffuser panel 4 are such that:

$\tau_{scattered}$ is within the range of approximately 0.05-0.5, for example 0.07-0.4, such as approximately 0.1-0.3, or such as approximately 0.15-0.25;

the average correlated color temperature ("CCT") $CCT\_\tau_{scattered}$ of the forward diffuse component is significantly higher than the average correlated color temperature $CCT\_\tau_{direct}$ of the transmitted component, namely $CCT\_\tau_{scattered} > h*CCT\_\tau_{direct}$ with h=1.2, for example h=1.3, such as h=1.5;

the first diffuser panel 4 does not absorb incident light significantly, namely the sum $\tau_{direct} + \tau_{scattered} + \rho_{direct} + \rho_{scattered}$ is at least equal to approximately 0.8, for example approximately 0.9, such as approximately 0.95, or such as approximately 0.97;

the first diffuser panel 4 scatters mostly forward, namely $\tau_{scattered} > \eta*\rho_{scattered}$, where $\eta$ is at least equal to approximately 1.1, for example $\eta$=1.3, such as approximately $\eta$=1.5, or such as approximately $\eta$=2; and the first diffuser panel 4 has low reflection, namely $\rho_{direct}$<0.09, for example <0.06, such as <0.03, or such as <0.02.

In greater detail, the first diffuser panel 4 includes a solid matrix of a first material (e.g., a resin having excellent optical transparency, such as thermoplastic resins, thermosetting resins, photocurable resins, acrylic resins, epoxy resins, polyester resins, polystyrene resins, polyolefin resins, polyamide resins, polyimide resins, polyvinyl alcohol resins, butyral resins, fluorine-based resins, vinyl acetate resins, or plastics such as polycarbonate, liquid crystal polymers, polyphenylene ether, polysulfone, polyether sulfone, polyarylate, amorphous polyolefin, or mixtures or copolymers thereof), wherein nanoparticles of a second material (e.g., inorganic oxide such as $ZnO$, $TiO_2$, $ZrO_2$, $SiO_2$, $Al_2O_3$) are dispersed, this second material having a refractive index different from the first material's refractive index. Both the first and the second materials basically do not absorb electromagnetic radiation in the visible wavelength range.

Moreover, in the embodiment shown in FIG. 1, the first diffuser panel 4 is uniform, in the sense that, given any point of the first diffuser panel 4, the physical characteristics of the first diffuser panel 4 in that point do not depend on the point itself. Furthermore, the first diffuser panel 4 is monolithic, namely the solid matrix does not feature any discontinuity due to gluing or mechanical coupling. Such characteristics of the first diffuser panel 4 are not, however, necessary to the aims of the subject matter disclosed herein, although they can render the first diffuser panel 4 easier to be manufactured.

More particularly, the nanoparticles may be monodisperse. The nanoparticles may be spherically shaped or shaped otherwise. The effective diameter D of the nanoparticles (for a definition in the case of non-spherical shape, see below) falls within the range of approximately [5 nm-350 nm], for example approximately [10 nm-250 nm], such as approximately [40 nm-180 nm], or such as approximately [60 nm-150 nm], where the effective diameter D is given by the diameter of the nanoparticles times the first material's refractive index.

Moreover, nanoparticles are distributed inside the first diffuser panel 4 so that their areal density, namely the number N of nanoparticles per square meter, i.e., the number of nanoparticles within a volume element delimited by a portion of the first surface $S_1$ having an area of 1 m$^2$, satisfies the condition $N \geq N_{min}$, where:

$$N_{min} = v \frac{10^{-29}}{D^6} \cdot \left| \frac{m^2 + 2}{m^2 - 1} \right|^2$$

wherein v is a dimensional constant equal to 1 meter$^6$, $N_{min}$ is expressed as a number/meter$^2$, the effective diameter D is expressed in meters, and wherein m is equal to the ratio of the second material's refractive index to the first material's refractive index.

For example, the nanoparticles are distributed homogenously, at least as far as the areal density is concerned, i.e., the areal density is substantially uniform across the first diffuser panel 4, but the nanoparticle distribution may vary across a direction perpendicular to the first and second surfaces $S_1$, $S_2$. The areal density varies, for example, by less than approximately 5% of the mean areal density. The aerial density is here intended as a quantity defined over areas larger than 0.25 mm$^2$.

Alternatively, embodiments are possible wherein the areal density varies, so as to compensate illumination differences over the first diffuser panel 4, as lit by the first light source 2. For example, the areal density N(x,y) at point (x,y) within $S_1$ may be related to the illuminance I(x,y) produced by the first light source 2 at point (x,y) via the equation $N(x,y) = N_{av} * I_{av}/I(x,y) \pm 5\%$, where $N_{av}$ and $I_{av}$ are the averaged illumination and areal density, these latter quantities being averaged over the first surface $S_1$. In this case the luminance of the first diffuser panel 4 is equalized across the first diffuser panel 4, in spite of the non-uniformity of the illumination profile of the first light source 2 on the first diffuser panel 4.

In the limit of small D and small volume fractions (i.e., thick panels) an areal density $N \approx N_{min}$ is expected to produce scattering efficiency of about 5%. As the number of nanoparticles per unit area gets higher, the scattering efficiency is expected to grow proportionally to N, until multiple scattering or interferences (in case of high volume fraction) occur, which might compromise color quality. The choice of the number of nanoparticles is thus biased by the search for a compromise between scattering efficiency and desired color, as described in detail in the patent application EP2304478, which is incorporated by reference. Furthermore, as the size of nanoparticles gets larger, the ratio $\eta = \tau_{scattered}/\rho_{scattered}$ of the forward to backward luminous flux grows, such ratio being equal to one in the Rayleigh limit. Moreover, as η grows, the aperture of the forward scattering cone gets smaller. Therefore, the choice of η is biased by the search for a compromise between having light scattered at large angles and minimizing the flux of backward scattered light. However, in a per se known manner, an antireflection layer (not shown) may be deposited on the first and the second surface $S_1$ and $S_2$, with the aim of minimizing $\rho_{direct}$; by doing so, the luminous efficiency of the lighting system 1 is raised and the visibility of the first diffuser panel 4 (as a physical element) from an observer in the room 6 is diminished.

Embodiments are, however, possible wherein nanoparticles do not have spherical shape; in such case, the effective diameter D can be defined as the effective diameter of the equivalent spherical particles, namely the effective diameter of spherical particles having the same volume as the aforementioned nanoparticles.

Furthermore, embodiments are possible wherein the nanoparticles are polydispersed, i.e., their effective diameters are characterized by a distribution N(D). Such distribution describes the number of nanoparticles per surface unit and unit interval of effective diameter in a neighborhood of the effective diameter D (that is, the number of particles per surface unit having an effective diameter between $D_1$ e $D_2$ is equal to $$N_{D_2-D_1} = \int_{D_1}^{D_2} N(D)dD).$$

These effective diameters may fall in the range of approximately [5 nm-350 nm], i.e., the distribution may be non-null within this range. In this case, considering that scattering efficiency grows approximately, i.e., in the limit of small particles, with the sixth power of the nanoparticle's diameter, the polydisperse distribution behaves approximately as a monodisperse distribution with a representative diameter $D'_{eff}$ defined as:

$$D'_{eff} = \left\{ \frac{\int N(D)D^6 dD}{N} \right\}^{1/6}$$

where $N = \int N(D)dD$ $D'_{eff}$ may by selected so as to lie within the range of approximately [5 nm-350 nm], for example approximately [10 nm-250 nm], such as approximately [40 nm-180 nm], or such as approximately [60 nm-150 nm].

Moreover, the first diffuser panel 4 is at a distance d from the first light source 2, measured along the axis H. Such distance d may be varied according to an expected position of the observer inside the room 6, so that the distance between the expected position of the observer and the first light source 2 is equal to at least approximately five meters, for example, approximately seven meters. For example, in the case of a ceiling-type application, distance d may be equal to approximately three meters. As a precaution, distance d may be equal to approximately five meters, in case the observer is very close to the second surface $S_2$.

Figure 2:
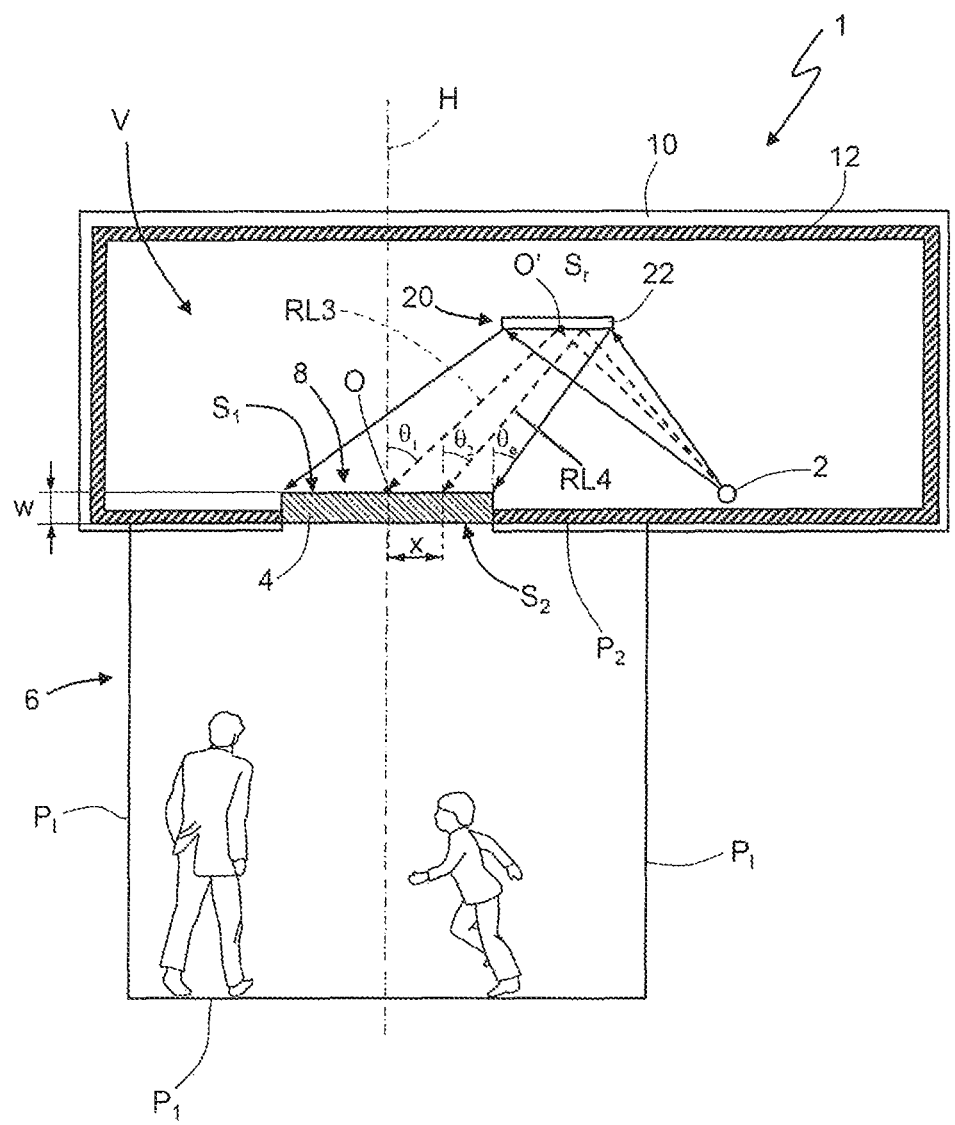

According to a different embodiment shown in FIG. 2, the first light source 2 is once again arranged inside the external volume V, but it is arranged off axis, i.e., laterally with respect to the first diffuser panel 4, i.e., it is not intercepted by any line that passes through the first diffuser panel 4 and is parallel to the axis H. Furthermore, the lighting system 1 includes a reflective system 20, which includes a first mirror 22 and forms a light path that connects the first light source 2 to the first diffuser panel 4; in other words, the light rays generated by the first light source 2 are conveyed by the reflective system 20 onto the first surface $S_1$. The first mirror 22 causes a last bend (i.e., a last change of direction) of the light path before the first diffuser panel 4.

In addition, the first light source 2 and the reflective system 20 are such that the first diffuser panel 4 is lit thoroughly by the light rays coming from the first light source 2. Furthermore, for reasons that will be described more accurately later on, the first diffuser panel 4 and the reflective system 20 are arranged so that they satisfy the following geometric condition. There are no couples composed by a light ray RL1 and a light ray RL2 such that:
- the light ray RL1 passes through the first diffuser panel 4 (as an example, coming from the room 6) or originates from the first diffuser panel 4; and
- the light ray RL2 is the reflection of the light ray RL1 by the reflective system 20 and it is directed so to impinge again on the first surface $S_1$.

The above-mentioned geometric condition on light rays RL1 and RL2 is equivalent to stating that no light ray generated inside the room 6 and intersecting the first surface $S_1$ in a first point can be subsequently reflected by the reflective system 20 in a manner such that it hits again the first surface $S_1$ in a second point. The reflective system 20 is arranged such that all inbound light rays emanating from the first surface $S_1$ and impinging onto the reflective system 20, irrespective of the position within the first surface $S_1$ from which the inbound light rays emanate, are reflected onto the internal layer 12.

The aforementioned geometric condition on light rays RL1 and RL2 leads to reducing the volume occupied by the lighting system 1, mainly in terms of the volume occupied outside room 6, without damaging the quality of lighting. In particular, the lighting system 1 features a reduction of the space occupied vertically, i.e., measured along the axis H. Given that a reduced vertical encumbrance is a prerequisite for a large number of applications, the above-mentioned geometric condition allows to obtain the breakthrough effect in a great number of situations of practical interest. For the sake of brevity, from now on the reference to the vertical dimension of the occupied space will be generally omitted.

In greater detail, besides leading to a reduction of the occupied space, the reciprocal arrangement of the reflective system 20 and the first diffuser panel 4 prevent the occurrence of two phenomena which could spoil the natural quality of the lighting.

Figure 3:
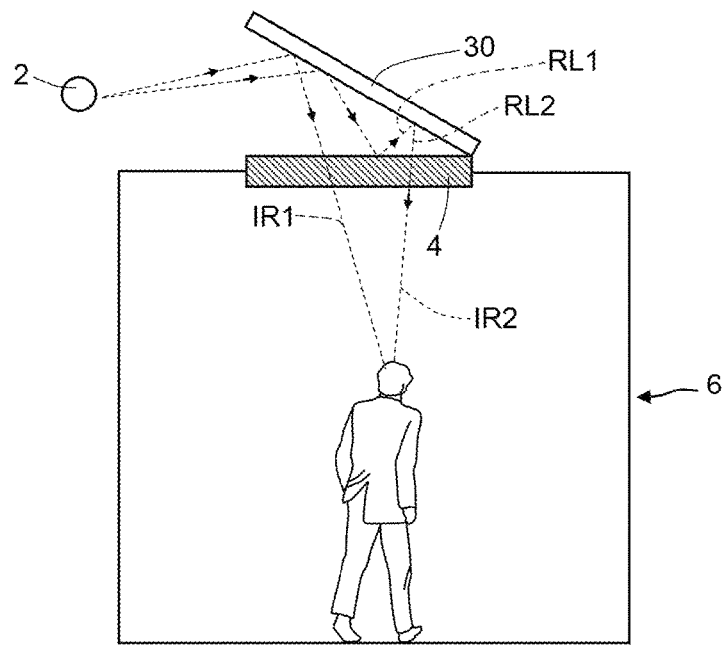
FIG. 3 shows a schematic cross-section of a possible lighting system different from the present lighting system, according to an embodiment.

As shown in FIG. 3, should the aforementioned geometric condition on the light rays RL1 and RL2 be violated, the following would happen:
- a light ray IR1 generated by the first light source 2 hits the reflective system (here designated by 30) and is conveyed onto the first diffuser panel 4, crosses the first diffuser panel 4 and reaches the observer; and
- a light ray IR2 generated by the first light source 2 hits the reflective system 30 a first time, is conveyed a first time onto the first diffuser panel 4, is partially reflected due to Fresnel reflection by the first surface $S_1$, hits the reflective system 30 a second time, is conveyed a second time onto the first diffuser panel 4, crosses the first diffuser panel 4 and reaches the observer from a different direction with respect to the light ray IR1.

In this case, the observer would experience the vision of two different images of the first light source 2, that are seen under different directions. The first image is the image formed by IR1 and by all the light rays close to IR1, i.e., the light rays that have crossed only one time the first diffuser panel 4. The second image is the image formed by the light ray IR2 and by all the light rays close to IR2, i.e., the rays which, having been partially reflected by the first surface $S_1$, are redirected by the reflective system 30 toward the observer. Since Fresnel reflection redirects only a portion (e.g., about 4% per each surface of the first diffuser panel 4, for incidence nearly perpendicular and for PMMA material), the second image of the first light source 2 is weaker than the first one. Nevertheless, its luminance is still very high; therefore, an observer would perceive the difference with natural lighting, which is evidently characterized by the presence of only one image of the sun.

In a similar way, should the aforementioned geometric condition on light rays RL1 and RL2 be missing, light rays coming from the room 6 and with any color could cross the first diffuser panel 4, be reflected by the reflective system 30 and re-enter the room 6 after crossing again the first diffuser panel 4. In such case, an observer would perceive the presence of luminous objects having colors different from the color of the first diffuser panel 4, as if they were arranged beyond the first diffuser panel 4. Furthermore, due to the so-called backscattering, the first diffuser panel 4 itself would be seen by the observer not only directly, but also through the reflective system 30; in practice, the first diffuser panel 4 would generate a luminous spot, spatially limited by the mirror frame, which would spoil the uniformity of the background. In addition, an observer could notice the presence of the reflective system 30 because of swift change in luminance that could take place at mirror edges. All these effects would cause the lighting to appear unnatural, the image of the first diffuser panel 4 being different from that of natural sky. Moreover, the perception of objects or mirrors in the background of the first diffuser panel 4 would prevent the obtaining of the breakthrough effect.

That having being stated, embodiments are possible where, as shown in FIG. 2, the first mirror 22 is planar and parallel to the first diffuser panel 4 (namely parallel to the first and second surfaces $S_1$, $S_2$), so that the occupied volume is minimized.

Moreover, irrespective of the shape and the angle of inclination of the first mirror 22, the first light source 2 and the first mirror 22 are arranged in such a way that, if the surface of the first mirror 22 is referred to as the reflecting surface $S_r$, the barycenter O of the first surface $S_1$ and the barycenter O' of the reflecting surface $S_r$ can be connected by a line, having an angle of incidence AO with respect to the axis H which is between approximately 40° and 65°, for example, between approximately 42° and 50°, such as in a neighborhood of 45°. In such a way, a compromise is reached between minimizing the space occupied vertically by the lighting system 1, which decreases as the angle of incidence AO gets larger, and minimizing the light losses due to the partial reflection which occurs at the first diffuser panel 4, which grows as the angle of incidence AO gets larger, in the hypothesis that the first diffuser panel 4 has refractive index basically equal to 1.5 and that the angle of incidence AO is higher than 45°. It is worthwhile noting that the benefit of illuminating the first diffuser panel 4 at an angle of incidence AO substantially equal to 45° holds true for all possible embodiments, including those described later and those without any mirror.

It has also been verified that, when the first mirror 22 is planar, the vertical space occupied by the lighting system 1 is minimized for any angle of incidence AO, provided that the first mirror 2 is parallel to the first diffuser panel 4.

Before moving on, the "carrier ray" is defined as the folded light path that connects the barycenter O" of the emitting surface $S_f$ (defined later on) of the first light source 2 to the barycenter O of the first surface $S_1$, via the reflective system 20, or the shortest among these light paths, if more than one light path exists; only one light path exists if the reflective system 20 is designed as an imaging-optic component.

Moreover, a Cartesian reference system is introduced, such a reference system having an origin in the barycenter O of the first surface $S_1$, and including an x-axis and an y-axis lying in the plane defined by the first surface $S_1$ and arranged in such a way that the y-axis is perpendicular to the plane of incidence of the carrier ray onto the reflecting surface $S_r$ of the first mirror 22 (i.e., the plane containing the two segments of the carrier ray that contact the first mirror 22, as well as the line perpendicular to the reflecting surface $S_r$ in the contact point).

Irrespective of the shape and the angle of inclination of the first mirror 22, embodiments are possible wherein the first surface $S_1$ has a rectangular or at least an elongated shape, with its largest axis being coincident with the y-axis. It has been verified that these embodiments allow fulfilling the geometric condition on the light rays RL1 and RL2 with a smaller height of the lighting system 1 along the axis H, with respect to the cases in which the first diffuser panel 4 is not elongated or is elongated along the x-axis, the area of the first diffuser panel 4 and the angle of incidence AO being the same. In other terms, these embodiments allow to maximize the area of the first diffuser panel 4 for a given height of the lighting system 1 and a given angle of incidence AO. In fact, it has been noted that, for a given angle of incidence AO, the maximum width of the first diffuser panel 4 along the x-axis is proportional to the minimum height of the lighting system 1 along the axis H, the proportionality coefficient being close to 1 when the angle of incidence AO is close to 45°.

Figures 4A, 4B:
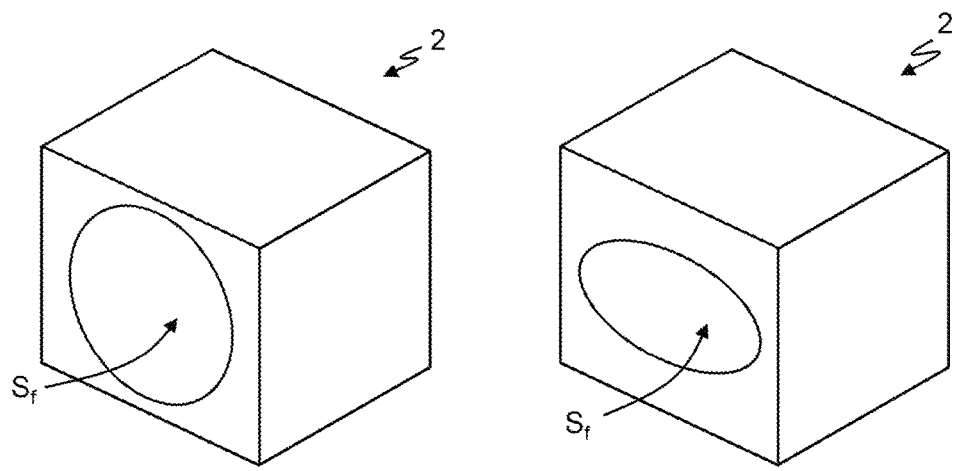
FIGS. 4a and 4b schematically show perspective views of light sources, according to an embodiment.

It has also been noticed that the natural quality of lighting is further improved if the first light source 2 features a circular (FIG. 4a) or elliptic (FIG. 4b) emitting surface $S_f$. Given that the first light source 2 is directional, it is characterized by a main direction, which is the direction of the absolute maximum of the luminous intensity, and by a main plane, here defined as the plane, perpendicular to the main direction, in which the absolute maximum of the luminance occurs. That having being said, the emitting surface $S_f$ is the portion of the main plane where the luminance along the main direction is higher than 10% of this absolute maximum of the luminous intensity. The emitting surface $S_f$ is called circular or elliptic if there exists a circumference or ellipse enclosing it and having an area greater than the area of emitting surface $S_f$, by no more than approximately 30%, for example, approximately 20%, such as approximately 10%.

All that being said, the light rays hit the first surface $S_1$ in corresponding points of incidence and form corresponding angles of incidence with the lines perpendiculars to the first surface $S_1$ and passing through the points of incidence. That having being said, the reflective system 20 and the arrangements of the first light source 2 and of the first diffuser panel 4 are such that, given:

a light ray RL3 that connects, via the reflective system 20, the barycenter O" of the emitting surface $S_f$ to the barycenter O of the first surface $S_1$, and forms an angle $\theta_1$ in respect to a line perpendicular to the first surface $S_1$ and passing through the barycenter O of this latter; and a light ray RL4 that connects, via the reflective system 20, the barycenter O" of emitting surface $S_f$ to a point of the first surface $S_1$ which is spaced apart of a distance X from the barycenter O of this latter, and that forms an angle $\theta_2$ in respect to a line perpendicular to the first surface $S_1$ and passing through this point;

it thus happens that:

$$|\tan(\theta_1-\theta_2)|X\cdot\cos(\theta_1)/L$$

where L is at least equal to approximately three meters and, for example, X<<L, e.g., X<10 cm. For example, L is at least equal to approximately four meters; still for example, L is at least equal to approximately five meters. Note that such condition is satisfied also by the embodiment shown in FIG. 1, provided that the aforementioned distance d of the first diffuser panel 4 from the first light source 2 is equal to L.

In such a way, the light rays impinge on the first surface $S_1$ with almost parallel directions, in a way similar to what happens in nature. Furthermore, this condition can be met even when the first light source 2 is at a physical distance from the first diffuser panel 4 lower than L, provided that the reflective system 20 includes converging mirrors, i.e., mirrors designed to form a virtual image of the first light source 2 at a distance greater than the physical distance.

Irrespective of the above details on the distance of the first diffuser panel 4 from the first light source 2, embodiments are however possible, wherein the light source 2 is arranged so that the illumination profile on the first surface $S_1$ varies between a minimum value $ILLU_{min}$ and a maximum value $ILLU_{max}$, wherein $ILLU_{max} \leq 3*ILLU_{min}$, in order to limit the illumination variations on the first diffuser panel 4. Such a condition on the illumination uniformity may be achieved by interposing a free-form optics between the first light source 2 and the first surface $S_1$ or by spacing the light source 2 apart from the first surface $S_1$ of a suitable distance. As an example, embodiments are possible, wherein the illumination produced by the first light source 2 on the first surface $S_1$ is substantially uniform, owing to the fact that the following relationship holds true:

$$|\tan(\theta_1-\theta_e)|\leq 0.5\cdot\cos(\theta_1)$$

wherein $\theta_e$ is the angle at which a further light ray, which originates from the barycenter O" of the emitting surface $S_f$ of the first light source 2, impinges on a point of the boundary of the first surface $S_1$, this point being the point among the points of the boundary having maximum distance from the barycenter O of the first surface $S_1$.

It has been further noticed that the natural quality of lighting improves whenever the maximum luminance of the first light source 2 is greater than approximately $10^6$ cd/m$^2$, for example, approximately $0.1*10^6$ cd/m$^2$, such as approximately $1*10^6$ cd/m$^2$, or such as approximately $10*10^6$ cd/m$^2$. For such values, as a matter of fact, the first light source 2 generates enough glare for the source itself to be difficult to look at, thereby preventing the observer from evaluating the source's distance by means of the mechanism of eye focusing. These luminance values thus contribute to obtaining the infinite breakthrough effect. Moreover, glare makes it difficult to detect possible non-uniformities in the luminance profile of the first light source 2, thus making it difficult to detect differences between the image of the first light source 2 and the image of the sun.

It has also been verified that the natural quality of lighting improves if the size and shape of the first light source 2 are such that, given a light ray that connects the perimeter of emitting surface $S_f$ to the barycenter O of the first surface $S_1$, the angle it forms with the abovementioned light ray RL3 is lower than approximately 4°, for example, approximately 3°, such as approximately 1.2°, or such as approximately 1.0°. As a matter of fact, the natural quality of lighting improves when the lower values of such angle are associated to the higher values of luminance, this condition allowing obtaining a more natural perception.

Figure 5A:
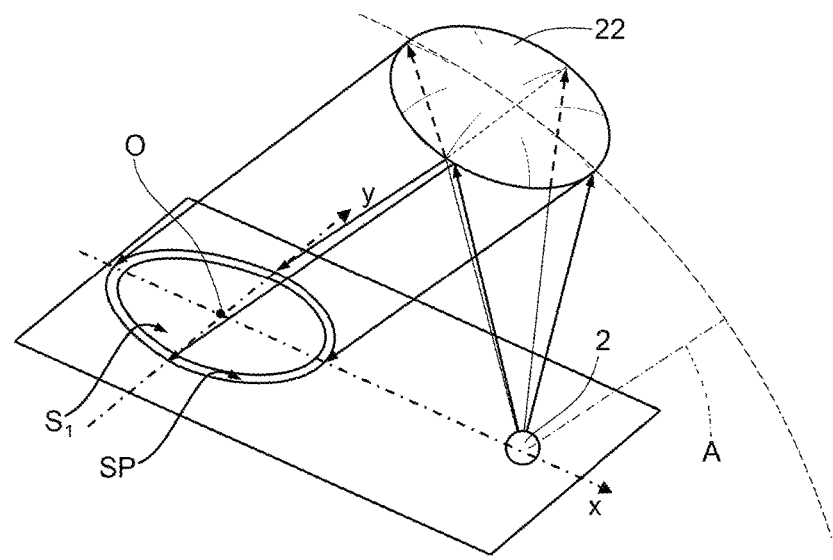
FIGS. 5a, 6, and 8 schematically show perspective views of portions of the present lighting system, according to an embodiment.
Figure 5B:
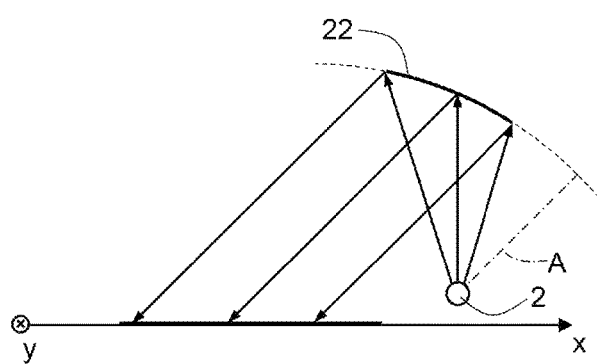
FIG. 5b shows a cross-section of a reflective element included in the lighting system's portion shown in FIG. 5a, according to an embodiment.

As shown in FIGS. 5a and 5b, independently from the details of the first diffuser panel 4, the first mirror 22 may be a concavely curved mirror, such as a concavely curved mirror having a parabolic curvature. In particular, as shown in FIGS. 5a and 5b, the first mirror 22 may be shaped as a portion of a circular paraboloid, i.e., a surface obtained by rotating a generator parabola around its axis A, such that the intersection with any plane including the axis A defines the same generator parabola. In particular, the portion of circular paraboloid is obtained by splitting a portion of the circular paraboloid surface with a secant plane that crosses the axis A forming an angle different from 90°. For the sake of brevity, from now on, reference is made to the circular paraboloid, without mentioning explicitly that the mirror is formed by a portion of the circular paraboloid.

According to this embodiment, the first light source 2 is arranged in the focus of the circular paraboloid; more precisely, the barycenter O" of the emitting surface $S_f$ of the first light source 2 is arranged in the focus of the circular paraboloid, so that the light rays coming from that barycenter and reflected by the circular paraboloid and hit the first surface $S_1$ with directions of propagation all parallel to the axis A. In this way, the observer perceives the first light source 2 as it were arranged at a virtually infinite distance, similarly to what happens with the sun, thereby enhancing the natural quality of lighting. In other words, the virtual image of the first light source 2 is at infinite distance from the observer.

Furthermore, the size of the first light source 2 perceived by the observer is given by the size of the image of the first light source 2 on the retina, and depends only on the physical dimension of the first light source 2 and on the magnification of the optical telescope system formed by the eye lens (the crystalline) and by the circular paraboloid; such optical telescope system has an image plane and an object plane which are arranged, respectively, in the focus of the eye lens and in the focus of the circular paraboloid. The abovementioned magnification is given by the ratio of the eye lens focal length to the circular paraboloid focal length; therefore, the size of the first light source 2 as perceived by the observer does not depend on the distance of the observer from lighting system 1. Thus, this additional condition contributes in creating a natural lighting effect, because the sun's perceived size does not depend on the observer's position.

I was also noticed that, if the emitting surface $S_f$ is shaped as a circle, the image of the first light source 2 perceived by the observer is still circle shaped, because the optical system shown in FIG. 5a does not twist the image.

The embodiment shown in FIG. 5a is characterized in that the vertical space occupied by the lighting system 1 is almost equal to the size of the first diffuser panel 4 along the x-axis, in case the light rays reflected by the circular paraboloid hit the first diffuser panel 4 at 45°, and the abovementioned geometric condition is met.

According to a variant, shown in FIG. 5a, the first and second surfaces $S_1$ and $S_2$ of the first diffuser panel 4 have an elliptic shape, such a shape being encompassed by the projection of circular paraboloid 22 on the xy plane along the direction given by the axis A. Therefore, the first and second surfaces $S_1$ and $S_2$ can be circumscribed by the luminous spot SP formed by the circular paraboloid in the xy plane, thereby reducing light losses. Moreover, the first mirror 22 is cut so as to accept a light beam having circular divergence, i.e., is cut in a way that its projection on the plane orthogonal to the line connecting the barycenter O" of the emitting surface $S_f$ and the vertex of the circular paraboloid has a circular shape, or at least circumscribes a circle with good approximation. However, other shapes of the first mirror 22 are also possible, e.g., an elongated shape along the y direction.

The use of the circular paraboloid implies that the light entering the room 6 through the first diffuser panel 4 projects on the floor of the room 6 a light spot having the same shape and size as the first diffuser panel 4, as it happens with sunlight through a window, thereby contributing to the natural lighting effect. Moreover, since the observer is capable of evaluating the distance of a generic light source based on the divergence of the light beam it generates, the lighting system 1 shown in FIG. 5a creates an effect of large depth of field even if the first light source 2 is not directly in the observer's visual field.

Figure 6:
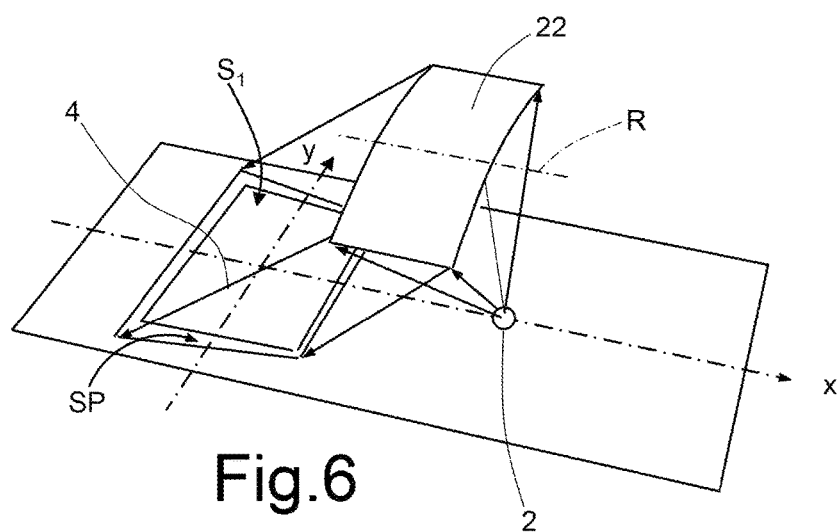

As shown in FIG. 6, the first mirror 22 may be shaped as the portion of a paraboloid with cylindrical symmetry, i.e., as a portion of a parabolic cylinder, this portion being obtained by intersecting the parabolic cylinder with three secant planes. In detail, it is known that, given a generator parabola and a reference line R, the parabolic cylinder is the ruled surface formed by lines parallel to the reference line R and incident on the generator parabola; in other words, the parabolic cylinder is obtained by translation of the generator parabola along the reference line R. In what follows, the reference line R is also called cylindrical axis.

In the embodiment shown in FIG. 6, the parabolic cylinder is obtained by translation of the generator parabola in a direction parallel to the x-axis. Moreover, the generator parabola has its vertex in the xH plane and it axis A oriented along a line which is specular to the line that connects the barycenter O of the first surface $S_1$ and the barycenter O' of the reflecting surface $S_r$ of the first mirror 22. In this embodiment, a plane tangent to the parabolic cylinder at the vertex of the generator parabola is parallel to the xy plane. Moreover, two out of three secant planes are, for example, parallel to yH plane, whereas the third plane is, for example, substantially parallel to plane xy. All that having being said, from now on, for the sake of brevity reference will be made to the parabolic cylinder, without mentioning explicitly that the mirror is formed by a portion of the parabolic cylinder.

In the embodiment shown in FIG. 6, the parabolic cylinder is laterally spaced apart along the x-axis, with respect to the axis H, so that the angle of incidence AO is substantially equal to 45°.

In greater detail, the barycenter O" of emitting surface $S_f$ is arranged in the xH plane, close to the line formed by the foci of the parabolae forming the parabolic cylinder, at the position which ensures the best collimation of the light rays directed toward the first diffuser panel 4, for what concerns the ray propagation in the plane containing the y-axis and the barycenter of the parabolic cylinder, and more generally what concerns ray propagation in all the planes that intersect the first diffuser panel 4 along lines parallel to the y-axis. In the following, the average divergence in these latter planes is referred for simplicity as divergence along the y-axis direction.

The embodiment shown in FIG. 6 allows to use a first diffuser panel 4 which is considerably longer along the y-axis than along the x-axis, thereby maximizing the area of the first diffuser panel 4 and so the angles under which the observer perceives the breakthrough effect. More precisely, such a large elongation of the first diffuser panel 4 is possible because the embodiment relies upon the usage of a mirror which features a large elongation in the y-axis direction, while preserving a limited (output) divergence in the same y-axis direction. More specifically, it has been noticed that the perceived size of the first light source 2 along the y-axis direction, i.e., the diameter of the perceived emitting surface $S_f$ along the y-axis direction, does not depend on the distance between the observer and the first light source 2, or it depends from this distance very weakly. Regarding the size of the first light source 2 perceived by the observer along the x-axis direction, it depends on the position of the observer and decreases with distance. Therefore, with the aim of assuring that a circular shape of the first light source 2 is perceived, a light source with an elliptic emitting surface $S_f$ can be adopted, wherein the eccentricity of the ellipse is fixed according to the expected point of observation inside the room 6.

A further advantage given by using a parabolic cylinder is the fact that such a kind of mirrors are easy to be manufactured, since they can be obtained by a plane-mirror foil, e.g., an Aluminium mirror foil. Furthermore, referring to an observer standing in vertical position and looking at the first light source 2 from a central position, i.e., through the barycenter O of the first surface $S_1$, and hence having the eyes aligned along the y-axis direction, he will perceive the first light source 2 at far distance, due to the fact that his eye-convergence operates only in planes containing both eyes (i.e., the y-axis direction), where high convergence occurs. That happens no matter the ray divergence in the orthogonal direction is.

In a different embodiment (not shown), the lighting system 1 is mounted in such a way that the first diffuser panel 4 is parallel to a vertical wall, instead of a ceiling, in such a way that the light beam from the first light source 2 enters the room 6 being parallel to floor and at an angle of about 45° with respect to the vertical wall. In this embodiment, the parabolic cylinder is obtained by translation of the generator parabola in a direction parallel to the y-axis, rather than the x-axis, this being the configuration that allows the largest depth perception for an observer, whose eyes are aligned in the x-axis. Also in this case, given a height of the lighting system 1 beyond the vertical wall, the largest area of the first diffuser panel 4 can be obtained by adopting a shape elongated in the y-axis direction.

Figure 7:
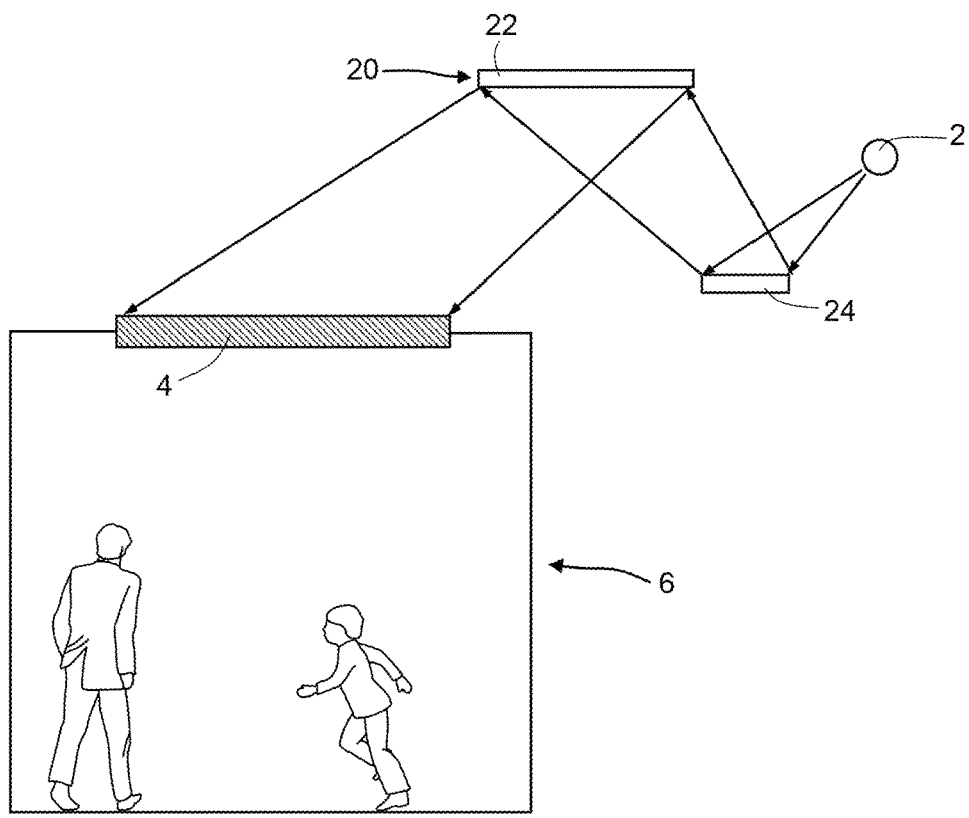

In a different embodiment, the reflective system 20 may include a second mirror 24, as shown for example in FIG. 7. That is, the aforementioned first mirror 22 can be one mirror of a plurality of mirrors of the reflective system 20, which causes the last bend of the light path along which the light rays generated by the first light source 2 are conveyed onto the first diffuser panel 4.

The second mirror 24 is optically interposed between the first mirror 22 and the first light source 2. In this case, the above-mentioned geometric condition does not change, because this condition refers to the overall reflective system 20. It is thus irrelevant if the light ray RL2 is generated by reflection of the light ray RL1 on just the first mirror 22, or on the first and second mirrors 22, 24. Similarly, the reflective system 20 may include additional reflective elements (not shown).

Figure 8:
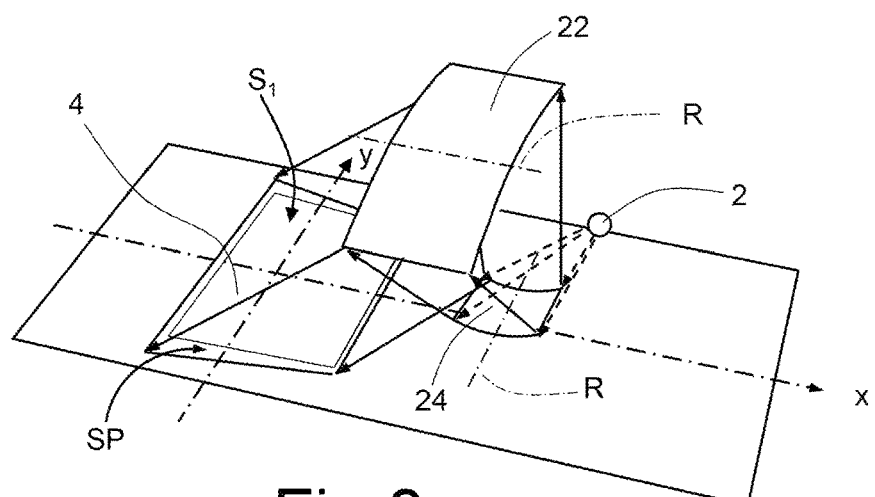

Any of the first and second mirrors 22, 24 may be plane or have different shape. In particular, as shown in FIG. 8, embodiments are possible wherein both the first and second mirrors 22, 24 are shaped as portions of two corresponding parabolic cylinders, that are generated by generator parabolae that lie in orthogonal planes, and that are translated along orthogonal directions and thus perform light collimation in orthogonal panes. In the present embodiment, for example, the first mirror 22 is similar to the parabolic cylinder shown in FIG. 6, whereas the second parabolic cylinder, which forms the second mirror 24, is obtained by taking a second generator parabola in the xH plane and by translating it along the y-axis direction, thus obtaining a beam-divergence reduction in the xH plane. Moreover, it has been verified that a good collimation in all the directions for the light rays reflected by the second mirror 24 towards the first mirror 22 is obtained when the second generator parabola has its axis oriented in a direction substantially parallel to the axis of the generator parabola of the first mirror 22, provided that the two parabolic cylinders are arranged so that they share a common focus (or, more precisely, so that the generator parabolae share a common focus, where the position of the focus of the generator parabola of the first mirror 22 accounts for the reflection by mirror 24) and the first light source 2 is arranged substantially in such a common focus.

The embodiment shown in FIG. 8 enables the use of a diffuser panel having a length along the y-axis which is considerably larger than the length along the x-axis, and therefore enables to maximize the area of the first diffuser panel 4, the vertical space occupied by this embodiment being equal to the one occupied in case of square panel. Moreover, this embodiment enables generating a light beam that impinges on the first surface $S_1$ with a reduced divergence along both the x-axis and the y-axis (i.e., along planes that intersect the xy plane along lines that are parallel to the x-axis and the y-axis, respectively). Therefore, the transmitted light rays have a divergence similar to sunrays. This condition contributes in creating a large depth of field perception even when the first light source 2 is not in the observer's visual field. Moreover, since the first light source 2 is arranged close to the common focus, the size of the first light source 2 as perceived by the observer does not depend on the distance. Finally, the illumination of a diffuser panel elongated along the y-axis direction is here made possible by starting from a light beam which impinges on the second mirror 24 with substantially a same divergence both in the plane of incidence and in the orthogonal plane, i.e., by efficiently using a light source that generates a light beam having a square-like cross-section. This result, that is achieved by performing the reduction of the initial beam divergence in two separate steps in the two orthogonal directions, represents an advantage respect to the case of a single parabolic cylinder, for which asymmetric beams are required, as described below.

Irrespective of the details of the first diffuser panel 4 and the reflective system 20, the first light source 2 may have, as explained before, an emitting surface $S_f$ with a circular or elliptic shape. In particular, the emitting surface $S_f$ may have an elliptic shape whenever the reflective system 20 includes at least one paraboloid with cylindrical symmetry, so that the different magnifications introduced along the x-axis and y-axis are compensated, thus allowing for the creation of a circle-shaped light spot on the observer's retina.

Figure 9A:
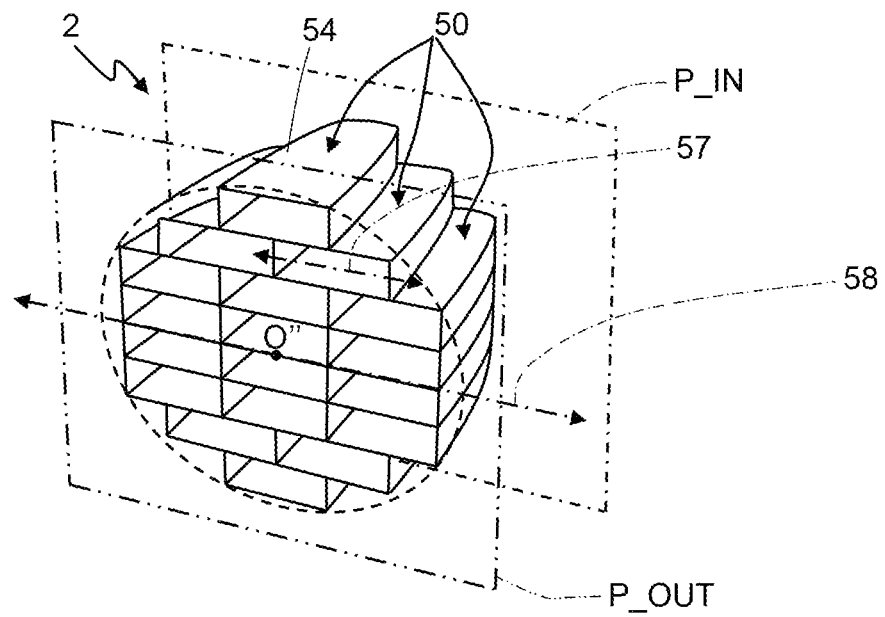
FIGS. 9a and 10 show perspective views of light sources, according to an embodiment.
Figure 9B:
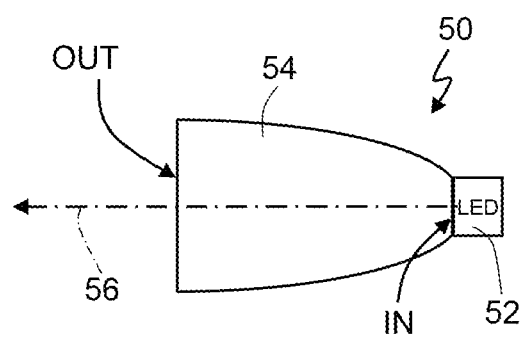
FIG. 9b shows a cross-section of a portion of the light source shown in FIG. 9a, according to an embodiment.

As shown in FIGS. 9a and 9b, the first light source 2 may be formed by a set of emitting devices 50. Each emitting device 50 is formed by a LED source 52 and a corresponding compound parabolic concentrator ("CPC") 54 of rectangular type, which features an input aperture IN and an output aperture OUT; the input aperture IN and the output aperture OUT may be respectively shaped as a first and a second rectangle, parallel and aligned to each other, the first rectangle having an area smaller than the second rectangle. Moreover, the first rectangle has a different ratio between the lengths of its axes of symmetry than the second rectangle. For example, the first rectangle has a greater ratio, i.e., it is more elongated, than the second one. The LED source 52 may be formed by an array of LED emitters (not shown) and is arranged close to the corresponding input aperture IN, in such a way that radiation emitted by the LED source 52 is coupled to the CPC concentrator 54 through the input aperture IN, and exits the output aperture OUT. Other types of reflective concentrators are however possible; similarly, light emitting devices other than LEDs can be used.

The light beam generated by each emitting device 50 has a rectangular cross-section, its divergence being maximum in the plane containing the axis of the beam itself, i.e., containing the optical axis 56 of the pair formed by the concentrator 54 and the corresponding LED source 52, and the greater of the symmetry axes of the rectangle defined by the output aperture OUT, designated by 57 in FIG. 9a. In case of a different output aperture OUT, the plane of maximum divergence would be spanned by the elongation direction, i.e., the direction of maximum extension of the outlet OUT, and the optical axis 56.

The amount of the beam divergence in each of the maximum-divergence plane and its orthogonal plane (also this latter containing the optical axis 56) scales with the ratio between the lengths of the corresponding side of the input rectangle, $d_{IN}$, and of the corresponding side of the output rectangle, $d_{OUT}$, and it is in particular equal to twice the arcsine of this ratio, i.e., $\arcsin(d_{IN}/d_{OUT})$. In this regard, not only the areas, but also the shapes of the input and output apertures have to be different, in order to ensure different divergences in the two orthogonal planes.

The size of the input aperture IN should be chosen so that it encloses the LED source 52. In the embodiment of FIGS. 9a and 9b, each concentrator 54 has a funnel-like shape and is formed by four parabolic reflective surfaces, each of which is one-dimensionally curved and has a generator parabolas lying either in the maximum-divergence plane or in its orthogonal plane, all the generator parabolae having their focuses in the input plane in which the input aperture IN lies. Moreover, the four parabolic reflective surfaces have the same length along the direction of the optical axis 56.

According to an embodiment, all the emitting devices 50 are equal, and the concentrators 54 are arranged so that the input apertures IN lie in the same input plane P_IN, and the output apertures OUT lie in the same output plane P_OUT. In particular, the concentrators 54 are arranged one next to the other, with output apertures OUT adjacent to each other, i.e., they are tightly packed, so that the maximum average luminance of the emitting surface $S_f$ is assured; moreover, the number and arrangement of the concentrators 54 are such that the surface composed by the union of all the output apertures OUT approximates a circular surface, although embodiments are possible in which the composed surface approximates an elliptical shape. Finally, all the emitting devices 50 are arranged so as to have their axes 56 oriented in approximately the same direction. In this circumstance, the first light source 2 has an own "plane of greater divergence", which is the plane that contains the barycenter O" of the emitting surface $S_f$ and that is parallel to the planes of maximum divergence of the emitting devices 50; furthermore, the first light source 2 has an "axis of greater divergence" 58, given by the intersection between the plane of greater divergence of the first light source 2 and the emitting surface $S_f$ of the first light source 2. Even if the axis of greater divergence has been introduced for the case of a plurality of rectangular concentrators 54, it is evident that other shapes of funnel-like concentrators 54 having output apertures elongated along parallel axes 57 lead to a light source still having an axis of greater divergence, which is parallel to the axes 57.

The first light source 2 shown in FIGS. 9a and 9b allows decoupling the light beam characteristics, and in particular the shape of its cross-section and its divergence, from the shape of the emitting surface $S_f$, without introducing any loss. In the present case, wherein the emitting devices 50 generate identical "unit light beams" having rectangular cross-section, the distances between the centers of output apertures OUT are small compared to the width of the composite light beam formed by the summation of all the unit light beams, this summation occurring because of the propagation of the composite beam and the divergence of each unit light beam. In practice, the unit light beams merge into one composite light beam that has the same rectangular cross-section and the same divergence as a single unit light beam. In other words, at distances which are great in respect to the diameter of the emitting surface $S_f$, the composite light beam has the same shape and divergence of the beam generated by a single emitting device 50, since it is formed by a plurality of identical unit light beams which are slightly shifted one respect to the other. Therefore, the embodiment shown in FIGS. 9a and 9b allows for a composite beam to be generated, having a section, in a plane perpendicular to the axis of the composite beam itself and at a desired distance from the first light source 2, which is a rectangle of desired area and shape. Furthermore, this embodiment enables to create a light source having an emitting surface $S_f$ which can have any shape, e.g., a circular or an elliptical shape. In what follows, this light source is referred to as "rectangular-beam source". It should be stressed that the result is not obtained by relying upon a knife-cut aperture and imaging optics as performed, e.g., for standard, theater-like, stage-light projectors, where the beam cut causes high transmission losses. Therefore, the rectangular-beam source allows minimizing the overall energy consumption.

Although not shown, a different embodiment is possible, in which the first light source includes a plurality of emitting devices, each of which is formed by a LED source having square shape, and a corresponding compound parabolic concentrator of a square type, which features a square input aperture and a square output aperture. In such a way, each emitting device generates a square beam, which has the same divergence in the two orthogonal directions (i.e., in the two planes containing the concentrator axis and, respectively, the two axis of the output aperture that are parallel to the sides of the output aperture). In particular, the present embodiment allows to generate a square beam with a desired divergence, for an arbitrary shape of the emitting surface $S_f$. In what follows, this first light source will be referred to as the "square-beam source".

In a further different embodiment (not shown), the first light source includes a plurality of emitting devices, each of which is formed by a LED source having a circular, and a corresponding compound parabolic concentrator of a circular type (not shown), which features a circular input aperture and a circular output aperture. In this case, the first light source generates a beam with a circular symmetry. Therefore, this first light source allows to generate a circular beam with a desired divergence, for an arbitrary shape of the emitting surface $S_f$. In what follows, this first light source will be referred to as the "circular-beam source".

In case the reflective system 20 is made of one or more plane mirrors, or in case the reflective system 20 includes a single mirror having the shape of a parabolic cylinder, the rectangular-beam source allows to obtain a luminous spot SP which is elongated along the y-axis, i.e., a luminous spot SP which circumscribes the first surface $S_1$ of the first diffuser panel 4, the first surface $S_1$ having the shape of a rectangle elongated along the y-axis. In both cases, the rectangular-beam source is oriented so that its axis of greater divergence 58 is "mapped" by the reflective system 20 onto the y-axis, so as to reduce the complexity of the lay-out of the reflective system. In the context of the subject matter disclosed herein, the reflector system is said to map the axis of greater divergence onto the y-axis if, given a narrow bundle of light rays including the carrier ray, originating at barycenter O" of the emitting surface $S_f$ and lying in the plane of greater divergence, the reflective system 20 causes the ray bundle to cross the first diffuser panel 4 along a line tangent to the y-axis. For example, if the reflective system 20 is such that the carrier ray is folded in a single plane, the rectangular-beam source is oriented with the axis of greater divergence 58 parallel to the y-axis.

In case the reflective system 20 includes two mirrors having the shapes of parabolic cylinders having orthogonal cylinder axes, the use of the square-beam source can be advantageous. In this case, in fact, it can be possible to rely upon the fact that the initial divergence of a square beam is reduced at two different distances from the first light source 2, for the purpose of obtaining a luminous spot SP elongated along the y-axis. This embodiment allows achieving an optimal coupling between commercially available LED emitters, that are typically square-shaped, and the concentrators.

Furthermore, in case the reflective system 20 includes a mirror having the shape of a circular paraboloid, the use of the circular-beam source can be advantageous. In this case, however, the light source 2 can be made of a single circular CPC, which is coupled to a circular LED assembly, this embodiment allowing obtaining a circular emitting surface $S_f$.

Figure 10:
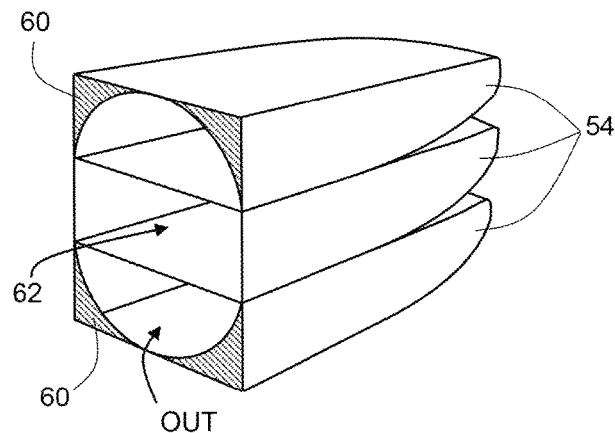

FIG. 10 shows an additional embodiment where the first light source 2 is again formed by identical CPC concentrators 54, their input apertures IN and output apertures OUT being again, exemplarily, rectangular-shaped. In this case, however, a mask 60 is applied on the overall aperture formed by the output apertures OUT; the mask 60, which lies in the output plane P_OUT, defines a mask aperture 62, having a shape which is a rounded rectangle with an area larger than the area of a single output aperture OUT. In particular, the mask 60 may be formed by a layer of optically absorbing material, so that the radiation may cross the output plane P_OUT only through the mask aperture 62. In this way, the first light source 2 is still perceived as having basically a circular emitting surface $S_f$. It has been further noticed that the mask 60 does not substantially distort the shape of the luminous spot SP formed in the plane of first surface $S_1$.

Independently from the number and the shape of the mirrors which form the reflective system 20, the lighting system 1 may include a second light source, which includes a diffused-light emitting layer, this layer being transparent, or at least partially transparent. In use, the additional light source emits diffused light from the emitting layer independently from being illuminated by the first light source 2, while an observer that looks through the diffused-light emitting layer of the second light source can see the first light source 2 beyond this emitting layer. In the present description, the term "transparent" is used for indicating the so-called "see through" optical property, i.e., the property of an optical element of transmitting image-forming light. More specifically, considering a light beam generated by a point-like D65 standard illuminant source set at a great distance from the diffused-light emitting layer (a beam, thus, constituted by light rays parallel to one another) and directed perpendicularly to the diffused-light emitting layer, so that a portion of the diffused-light emitting layer is illuminated by a certain bundle of rays generated by the D65 standard illuminant, the diffused-light emitting layer is defined as partially transparent if at least approximately 50%, for example, approximately 70%, such as approximately 85%, of the light rays of the bundle are transmitted by the diffused-light emitting layer within a cone with a FWHM angular aperture not larger than approximately 8°, for example approximately 4°, such as approximately 2°. For the sake of completeness, it has further to be noted that also the first diffuser panel 4 is partially transparent.

From a practical point of view, given a standard illuminant (e.g., a D65 source) which emits light uniformly from a circular emitting surface, and given a standard observer who sees the emitting surface under a conical solid angle of approximately 8°, for example, approximately 4°, or approximately 2°, the luminance of the emitting surface as perceived by the observer when the partially transparent diffused-light emitting layer is interposed between the observer and the emitting surface is hence at least approximately 50%, for example at least approximately 70%, such as at least approximately 85% of the corresponding luminance perceived by the observer when the diffused-light emitting layer is absent.

Figure 11:
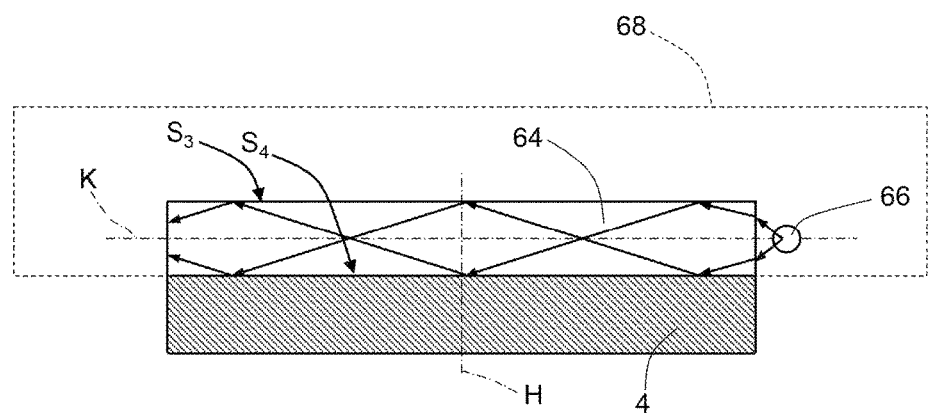
FIG. 11 shows a cross-section of a portion of an embodiment of the present lighting system.

All that having being said, as shown in FIG. 11, the second light source (designated by 68) may be arranged parallel to the first diffuser panel 4, e.g., above it, and for example in direct contact with it.

The second light source 68 may include a second diffuser panel 64 and an illuminator 66, the second diffuser panel 64 being shaped as a light guide side-lit by the illuminator 66, the illuminator 66 being formed, as an example, by a linear stripe of LEDs or a fluorescent tube lamp, so that light emitted by the illuminator 66 propagates in guided-mode inside the second diffuser panel 64, which diffuses it homogeneously. The second diffuser panel 64 may be, for example, a commercial diffuser suitable for side-lighting as, e.g., "Acrylite® LED" or "Plexiglas® LED EndLighten". Moreover, as shown in FIG. 11, the thickness along the axis H of the second diffuser panel 64 is negligible compared to thickness along a direction K perpendicular to the axis H.

In a particular configuration, the second diffuser panel 64 is formed by a third material (e.g., a material chosen from among the materials previously listed with reference to the first material), wherein microparticles of a fourth material (e.g., ZnO, $TiO_2$, $ZrO_2$, $SiO_2$, $Al_2O_3$) are dispersed; such third and fourth material do not absorb light with wavelengths in the visible range. In particular, the diameters of microparticles may range from approximately 2 μm to approximately 20 μm.

When in use, part of the radiation guided by the second diffuser panel 64 exits the second diffuser panel 64 while propagating along the second diffuser panel 64, due to diffusion by microparticles of the fourth material. Since the second diffuser panel 64 has negligible thickness along the axis H compared to the direction K, the second diffuser panel 64 is basically transparent to radiation propagating along the axis H, but works as a diffuser for radiation propagating along the direction K.

Moreover, assuming that the second diffuser panel 64 is delimited on the upper and the lower side by a third and a fourth surface $S_3$, $S_4$, at least one out of such third and fourth surface $S_3$, $S_4$ can be surface finished to introduce roughness. Such roughness contributes to the diffusion by the second diffuser panel 64 of the light generated by the illuminator 66, the diffusion process being virtually homogeneous along any direction parallel to the direction K. In a per se known manner, roughness can be designed so that great part of the light generated by the illuminator 66 is scattered mainly through one between the third and the fourth surface $S_3$, $S_4$, and in particular towards the first diffuser panel 4. In case at least one between the third and the fourth surface $S_3$, $S_4$ features roughness, no microparticles need to be dispersed in the second diffuser panel 64. In any case, roughness may be present on both the third and the fourth surface $S_3$, $S_4$ of the second diffuser panel 64.

In a different configuration, the second light source 68 includes a substantially transparent emitting surface, which is made of an OLED film. The OLED film is also capable to generate diffused light with controlled color and intensity, being at the same time transparent to the light that crosses it along a direction perpendicular to its surface.

The second light source 68 allows changing the color and intensity of the diffused-light component generated by lighting system 1, basically without changing the color and intensity of the transmitted component. For this aim, it is possible to act on the color and intensity of the light emitted by the second light source 68.

For example, aiming at reproducing the characteristics of late afternoon light, a lamp with low CCT, e.g., 2500 K, can be used as the first light source 2; in this way, the color of the transmitted component is similar to the color of sunlight before sunset. Without the second light source 68, the color of the component scattered by just the first diffuser panel 4 would be different from the color of the corresponding natural component. As a matter of fact, what happens in nature is that the sky above the observer is lit by white sunlight, i.e., by sunlight that has not crossed the atmosphere yet, having a CCT which is equal approximately to 6000 K, a much higher value than the lamp's CCT. As a consequence, the CCT of the light scattered by the sky above the observer in the late afternoon hours is significantly higher than the CCT of the light scattered by the first diffuser panel 4, in case the first light source 2 that illuminates this latter has low CCT. However, if the second light source 68 is used, and particularly if the second diffuser panel 64 is used together with the illuminator 66, and this latter is made of an ensemble of red, green, blue ("RGB") LED emitters, it is possible to adjust the luminous flux for each of such three elements; this allows for the second diffuser panel 64 to generate a scattered component having color and intensity which are such that the overall component that exits the first diffuser panel 4 and is scattered by the first and the second diffuser panel 4, 64, has the desired color. In other words, the second source 68 allows for decoupling the color of the transmitted component from the color of the scattered component. Moreover, if a lamp with adjustable CCT is used as the first light source 2, the variation of natural lighting at different times of the day can be reproduced.

Other embodiments are also possible where the second light source 68 is placed under the first diffuser panel 4, in such a way that the light generated by the first light source 2 passes through the first diffuser panel 4 before passing through the second diffuser panel 64. Moreover, additional embodiments are possible where the first and second diffuser panels 4, 64 are physically separated.

Finally, embodiments are also possible where the second light source 68 is used in the absence of the first diffuser panel 4, i.e., in the absence of the Rayleigh panel. In this case the axis H is a line perpendicular to the diffuse-light emitting layer and crossing the barycenter of the diffuse-light emitting layer.

In view of the above, all the disclosed embodiments refer to a system including a first light source, a diffused-light generator and a dark box, wherein the diffused-light generator is shaped as a layered component delimited by an inner surface (facing the dark box) and an outer surface (facing the room), and the first light source is configured to emit a visible-light beam, and the dark box is optically coupled to the room via the diffused-light generator. Moreover, the diffused-light generator is configured to receive the visible-light beam, and to be at least partially transparent to the visible-light beam, and to transmit at least part of the visible-light beam, and to emit visible diffused light from the outer surface, and to generate a transmitted light having CCT is lower than the CCT of the visible diffused light. The diffused-light generator may be substantially free from chromatic absorption or reflection, i.e., from preferentially absorbing or reflecting a limited portion of the visible-light spectrum with respect to another portion.

More in particular, the CCT of the diffused light is higher than the CCT of the transmitted light; still more in particular, the CCT of the transmitted light is not greater than the CCT of the light beam generated by the first light source. Furthermore, as already said, in the context of the present invention, the light "transmitted" by an optical element is meant as the portion of the light rays impinging onto the optical element which cross the optical element without suffering significant angular deviation, e.g., being deviated by an angle smaller than approximately 0.1°. Therefore, an optical component is said to "transmit at least a portion" of an impinging light beam whenever it produces a transmitted light component.

As explained above, the diffused-light generator may be formed by a Rayleigh diffusing layer, i.e., a layer which selectively diffuses the short-wavelength component of the luminous radiation coming from a main light source, this Rayleigh diffusing layer being shaped, e.g., as a flat panel (as in the case of the first diffuser panel 4), or as a curved panel (not shown). In addition, or alternatively, the diffused-light generator may be formed by a diffused-light source, i.e., a light source that emits diffused light from an extended layer orthogonal to the axis H, independently from the light received from the main light source. In the case of using just the diffused-light source, this source does not operate for correcting the color of the diffused light as produced by, e.g., the first diffuser panel 4, but for generating the entire diffused component of the light emitted by the lighting system. In certain embodiments, the diffused-light generator may have an elongated shape.

Advantages brought by the present lighting system are made evident by the previous description.

In detail, an embodiment of the present lighting system allows for an observer to perceive the existence of an unlimited space beyond the diffused-light generator, similarly to what happens in nature when the sky and the sun illuminate a room through a window. Such result is due to the presence of the dark box, which is coupled to the room by means of the diffused-light generator. The dark box allows for perceiving an homogeneous black background for every direction along which the first and/or second diffuser panels are observed. Moreover, such effect is improved by adopting a suitable observer-to-source distance (and thus, a first and/or second panel-to-source distance), or by using a reflective system which reflects light rays in such a way that they feature a limited range of slopes.

Furthermore, some embodiments give rise to the aforementioned breakthrough effect while limiting the space occupied by the lighting system. In particular, the embodiment shown in FIG. 2 is an off-axis lighting system, namely a system wherein the light source and the first diffuser panel are not aligned, which allows reducing the space occupied by the system itself, without spoiling the quality of the illumination.

Eventually, it is evident that modifications and variations can be made to the present lighting system without departing from the scope of the present disclosure.

For example, the position of the light source with respect to the focus/focuses of the optical elements of the reflective system can be different than those described. Furthermore, instead of, or in addition to a converging mirror, the reflective system may include a diverging mirror. In addition, in order to achieve full divergence removal, at least along the y-axis direction, more complex shapes of the mirrors (e.g., free-form shapes) can be considered.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A lighting system for illuminating an environment with a light that visually simulates sunlight and/or light diffused by one of sunlight and light diffused by the Earth's atmosphere, which comprises:
   a first light source configured to emit a beam of visible light;
   a diffused-light generator delimited by an inner surface, configured to receive the light beam, and by an outer surface, said diffused-light generator being at least partially transparent to the light beam, being configured to transmit at least part of the light beam, and being further configured to emit, through the outer surface, visible diffused light, the correlated color temperature (CCT) of the transmitted light being lower than the CCT of the visible diffused light; and
   a dark box housing the first light source, said dark box being optically coupled to the environment via the diffused-light generator, at least part of said dark box being configured to absorb visible radiation; and
   a reflective optical system arranged inside the dark box and configured to convey the light beam onto the diffused-light generator, the first light source and the reflective optical system being configured so that the light beam entirely illuminates the outer surface of the diffused-light generator;
   wherein the diffused-light generator is arranged with respect to the first light source so that the relation $|\tan(\theta_1-\theta_2)| \leq X \cdot \cos(\theta_1)/L$ holds true for each point of the inner surface spaced apart from a geometric center of the inner surface by X, with X<<L, wherein:
   $\theta_1$ is the angle at which a first light ray of the light beam, which originates from the geometric center of an emitting surface of the first light source, impinges on the geometric center of the inner surface;
   $\theta_2$ is the angle at which a second light ray, which originates from the geometric center of the emitting surface of the first light source, impinges on said at least one point of the inner surface; and
   L is equal to, or greater than, three meters.

2. The lighting system according to claim 1, wherein the diffused-light generator is such that the CCT of the transmitted light is not greater than the CCT of the light beam.

3. The lighting system according to claim 1, wherein the diffused-light generator is such that the CCT of the visible diffused light is greater than the CCT of the light beam.

4. The lighting system according to claim 1, wherein the first light source is configured so that the illuminance across the inner surface varies between a minimum value and a maximum value, the maximum value being not greater than three times the minimum value.

5. A lighting system for illuminating an environment with a light that visually simulates at least one of sunlight and light diffused by the Earth's atmosphere, which comprises:
   a first light source configured to emit a beam of visible light;
   a diffused-light generator delimited by an inner surface, configured to receive the light beam, and by an outer surface, said diffused-light generator being at least partially transparent to the light beam, being configured to transmit at least part of the light beam, and being further configured to emit through the outer surface, visible diffused light, the correlated color temperature (CCT) of the transmitted light being lower than the CCT of the visible diffused light; and
   a dark box housing the first light source, said dark box being optically coupled to the environment via the diffused-light generator, at least part of said dark box being configured to absorb visible radiation; and
   a reflective optical system arranged inside the dark box and configured to convey the light beam onto the diffused-light generator, the first light source and the reflective optical system being configured so that the light beam entirely illuminates the outer surface of the diffused-light generator;
   wherein the diffused-light generator is arranged with respect to the first light source so that the relation $|(\tan(\theta_1-\theta_e)| \leq 0.5 \cdot \cos(\theta_1))$ holds true, wherein:
   $\theta_1$ is the angle at which a first light ray of the light beam, which originates from the geometric center of an emitting surface of the first light source, impinges on the geometric center of the inner surface; and
   $\theta_e$ is the angle at which a second light ray, which originates from the geometric center of the emitting surface of the first light source, impinges on a point of a boundary of the inner surface, said point being the point among the points of the boundary having maximum distance from the geometric center of the inner surface.

6. The lighting system according to claim 1, wherein the first light source is arranged off-axis with respect to a line perpendicular to the inner surface and passing through the geometric center of the inner surface.

7. A lighting system for illuminating an environment with a
   light that visually simulates at least one of sunlight and light diffused by the Earth's atmosphere, which comprises:
   a first light source configured to emit a beam of visible light;
   a diffused-light generator delimited by an inner surface, configured to receive the light beam, and by an outer surface, said diffused-light generator being at least partially transparent to the light beam, being configured to transmit at least part of the light beam, and being further configured to emit, through the outer surface, visible diffused light, the correlated color temperature (CCT) of the transmitted light being lower than the CCT of the visible diffused light;

a dark box housing the first light source, said dark box being optically coupled to the environment via the diffused-light generator, at least part of said dark box being configured to absorb visible radiation; and a reflective optical system arranged inside the dark box and configured to convey the light beam onto the inner surface, said reflective optical system being configured so that substantially all light rays emanating, in use, from the inner surface and impinging onto the reflective optical system are not reflected onto the inner surface.

8. The lighting system according to claim 7, wherein the reflective optical system comprises a first mirror of a plane type.

9. The lighting system according to claim 8, wherein said first mirror is arranged in parallel to the inner surface, in a manner such that a projection of the first mirror along a plane containing the inner surface does not overlap with the inner surface.

10. The lighting system according to claim 7, wherein the reflective optical system comprises a first mirror of the converging type.

11. The lighting system according to claim 10, wherein the first mirror is shaped as a portion of a circular paraboloid.

12. The lighting system according to claim 10, wherein the first mirror is shaped as a portion of a parabolic cylinder.

13. The lighting system according to claim 12, wherein the reflective optical system further comprises a second mirror shaped as a portion of a parabolic cylinder, the axes of the first and second mirrors being substantially orthogonal to each other.

14. The lighting system according to claim 13, wherein the first and second mirrors are arranged so as to share a common focus, the first light source being arranged substantially in the common focus.

15. The lighting system according to claim 7, wherein the reflective optical system forms a light path connecting the first light source to the inner surface, the first mirror causing a last bend of the light path before the inner surface; and wherein a light ray connecting a be geometric center of the first mirror to a geometric center of the inner surface via the reflective optical system forms an angle within 40° to 65°, both inclusively, relative to a direction perpendicular to the inner surface in the geometric center of the inner surface.

16. The lighting system according to claim 1, wherein the first light source is formed by a plurality of light emitting devices and a plurality of reflective concentrators, each reflective concentrator being funnel-shaped and having an input aperture and an output aperture, the area of the input aperture being smaller than the area of the output aperture, each light emitting device being optically coupled to the input aperture of a respective reflective concentrator.

17. The lighting system according to claim 16, wherein the output aperture of each reflective concentrator is shaped as a rectangle.

18. The lighting system according to claim 7, wherein the first light source is formed by a plurality of light emitting devices and a plurality of reflective concentrators, each reflective concentrator being funnel-shaped and having an input aperture and an output aperture, the area of the input aperture being smaller than the area of the output aperture, each light emitting device being optically coupled to the input aperture of a respective reflective concentrator; and wherein the output apertures are elongated along an elongation direction, said light beam having an axis of maximum divergence, the reflective optical system being configured so that, in use, a bundle of light rays emanating from the geometric center of an emitting surface of the first light source and lying in the plane of maximum divergence impinges on the inner surface along a line tangent to an axis that passes through the geometric center of the inner surface being perpendicular to the plane of incidence of a carrier ray onto the first mirror, the carrier ray being the light ray connecting the geometric center of the emitting surface to the geometric center of the inner surface, via the reflective optical system.

19. The lighting system according to claim 18, wherein the reflective optical system is configured so that the carrier ray lies in a single plane, and wherein the first light source is arranged so that said axis of maximum divergence is perpendicular to said single plane.

20. The lighting system according to claim 16, wherein the first light source further comprises a mask having a circular or elliptical overall aperture, said mask being coplanar with said output apertures, said mask being suitable for blocking light coming from portions of the output apertures which are arranged around said overall aperture.

21. The lighting system according to claim 1, wherein the diffused-light generator comprises a first diffuser configured to substantially not absorb light in the visible range and to diffuse more efficiently the short-wavelengths components in respect to the long-wavelength components of the light beam.

22. The lighting system according to claim 21, wherein the first diffuser comprises a matrix of a first material wherein first particles of a second material are dispersed, said first and second materials having, respectively, a first and a second refractive indexes, said first particles having equivalent diameters such that the product of such equivalent diameters times the first refractive index is in the range 5 nm-350 nm.

23. The lighting system according to claim 22, wherein the first light source and the density of the particle distribution across the first diffuser are such that the product between the density and the illuminance provided by the first light source, when in use, across the first diffuser is substantially constant across the first diffuser.

24. The lighting system according to claim 21, wherein said first diffuser has a panel shape, at least one of said inner and outer surface being formed by the first diffuser.

25. The lighting system according to claim 1, wherein the diffused-light generator comprises a second light source configured to emit at least a portion of said visible diffused light independently from the first light source.

26. The lighting system according to claim 25, wherein the second light source comprises:

a second diffuser shaped as a light-guiding panel configured for edge lighting; and an illuminator for edge lighting into the second diffuser.

27. The lighting system according to claim 26, wherein the CCT of at least one of the first light source and the illuminator is variable in a controllable manner.

28. The lighting system according to claim 25, wherein the second light source comprises an OLED.

29. The lighting system according to claim 1, wherein the diffused-light generator has an elongated shape.

30. A building comprising the lighting system according to claim 1 and a wall of said environment, wherein said wall forms a cavity, the diffused-light generator extending inside the cavity.

31. The lighting system according to claim 1, wherein the size and shape of the first light source are such that, given any light ray that connects the perimeter of an emitting surface of the first light source to the geometric center of the inner surface, the angle it forms with the light ray which connects the geometric center of the emitting surface to the geometric center of the inner surface is lower than 4°.

32. The lighting system according to claim 1, wherein X<10 cm.

* * * * *